US012361333B2

(12) United States Patent
Jia

(10) Patent No.: US 12,361,333 B2
(45) Date of Patent: Jul. 15, 2025

(54) ROAD MODELING WITH ENSEMBLE GAUSSIAN PROCESSES

(71) Applicant: Aptiv Technologies AG, Schaffhausen (CH)

(72) Inventor: Bin Jia, Columbia, MD (US)

(73) Assignee: Aptiv Technologies AG, Schaffhausen (CH)

(*) Notice: Subject to any disclaimer, the term of this patent is extended or adjusted under 35 U.S.C. 154(b) by 874 days.

(21) Appl. No.: 17/645,931

(22) Filed: Dec. 23, 2021

(65) Prior Publication Data

US 2023/0206136 A1 Jun. 29, 2023

(51) Int. Cl.
*G06N 20/20* (2019.01)
*B60W 30/12* (2020.01)
(Continued)

(52) U.S. Cl.
CPC ............ *G06N 20/20* (2019.01); *B60W 30/12* (2013.01); *B60W 40/06* (2013.01); *B60W 50/00* (2013.01); *G01S 13/66* (2013.01); *G01S 13/86* (2013.01); *G06F 17/18* (2013.01); *G06F 18/22* (2023.01); *G06F 18/253* (2023.01); *G06F 18/27* (2023.01);
(Continued)

(58) Field of Classification Search
CPC ........ G06N 20/00; G06N 20/10; G06N 20/20; G06N 3/08; G06N 3/091; B60W 30/12; B60W 40/06; B60W 50/00; B60W 60/001; B60W 2050/0028; B60W 2050/0043; B60W 2552/00; B60W 2552/45; B60W 2754/20; B60W 2754/30; G01S 13/66; G01S 13/86; G06F 17/18; G06F 18/22; G06F 18/253; G06F 18/27; G06F 18/29;
(Continued)

(56) References Cited

U.S. PATENT DOCUMENTS

| 2020/0207326 A1* | 7/2020 | Wenger | B60H 1/00735 |
| 2021/0026853 A1* | 1/2021 | Sawada | G06Q 10/04 |
| 2022/0077944 A1* | 3/2022 | Zou | H04W 4/33 |

FOREIGN PATENT DOCUMENTS

EP 2530628 A1 12/2012

OTHER PUBLICATIONS

Lźaro-Gredilla, et al., "Variational Heteroscedastic Gaussian Process Regression.", Jan. 2011, 8 pages.
Liu, et al., "Generalized Robust Bayesian Committee Machine for Large-scale Gaussian Process Regression", Jun. 3, 2018, 13 pages.
(Continued)

*Primary Examiner* — Shane D Woolwine
(74) *Attorney, Agent, or Firm* — Harness, Dickey & Pierce, P.L.C.

(57) ABSTRACT

This document describes road modeling with ensemble Gaussian processes. A road is modeled at a first time using at least one Gaussian process regression (GPR). A kernel function is determined based on a sample set of detections received from one or more vehicle systems. Based on the kernel function, a respective mean lateral position associated with a particular longitudinal position is determined for each GPR of the at least one GPR. The respective mean lateral position for each of the at least one GPR is aggregated to determine a combined lateral position associated with the particular longitudinal position. A road model is then output including the combined lateral position associated with the particular longitudinal position. In this way, a robust and computationally efficient road model may be determined to aid in vehicle safety and performance.

30 Claims, 13 Drawing Sheets

(51) Int. Cl.
| | |
|---|---|
| *B60W 40/06* | (2012.01) |
| *B60W 50/00* | (2006.01) |
| *B60W 60/00* | (2020.01) |
| *G01S 13/66* | (2006.01) |
| *G01S 13/86* | (2006.01) |
| *G06F 17/18* | (2006.01) |
| *G06F 18/20* | (2023.01) |
| *G06F 18/22* | (2023.01) |
| *G06F 18/25* | (2023.01) |
| *G06F 18/27* | (2023.01) |
| *G06V 10/62* | (2022.01) |
| *G06V 10/766* | (2022.01) |
| *G06V 10/80* | (2022.01) |
| *G06V 20/56* | (2022.01) |

(52) U.S. Cl.
CPC .............. *G06F 18/29* (2023.01); *G06V 10/62* (2022.01); *G06V 10/766* (2022.01); *G06V 10/806* (2022.01); *B60W 2050/0028* (2013.01); *B60W 2050/0043* (2013.01); *B60W 60/001* (2020.02); *B60W 2552/00* (2020.02); *B60W 2556/45* (2020.02); *B60W 2754/20* (2020.02); *B60W 2754/30* (2020.02); *G06V 20/588* (2022.01)

(58) Field of Classification Search
CPC ................. G06V 10/62; G06V 10/766; G06V 10/806; G06V 20/588
See application file for complete search history.

(56) References Cited

OTHER PUBLICATIONS

McHutchon, et al., "Gaussian Process Training with Input Noise", Jan. 2011, 9 pages.
Rasmussen, et al., "Gaussian Processes in Machine Learning", Aug. 2004, 9 pages.
Wang, et al., "A Robust Submap-Based Road Shape Estimation via Iterative Gaussian Process Regression", Jun. 2017, pp. 1776-1781.
Wang, et al., "Gaussian process regression with multiple response variables", Jan. 2015, 23 pages.
"Extended European Search Report", EP Application No. 22198268. 9, Apr. 12, 2023, 12 pages.
Chen, et al., "Velodyne-based Curb Detection Up to 50 Meters Away", 2015 IEEE Intelligent Vehicles Symposium (IV), Jun. 28, 2015, 8 pages.

* cited by examiner

ROAD MODELING WITH ENSEMBLE GAUSSIAN PROCESSES

BACKGROUND

Many modern vehicles include advanced driver-assistance systems (ADAS) that include features such as adaptive cruise control (ACC) and automatic emergency braking (AEB) that may rely on road models to perform properly. To enable such features, many vehicles include perception systems that analyze vehicle surroundings to create grid-based road models or parameterized road models, however, these models often fail to provide flexibility for robustly representing road geometries. Moreover, some road models may be inefficient and fail to process large amounts of data quick enough to support driving, resulting in delayed outputs to vehicle subsystems that acting on the outputs, which can result in a vehicle performing unsafe or erratic driving behaviors.

SUMMARY

This document describes road modeling with ensemble Gaussian processes. A road is modeled at a first time using at least one Gaussian process regression (GPR). A kernel function is determined based on a sample set of detections received from one or more vehicle systems. Based on the kernel function, a respective mean lateral position and its uncertainty associated with a particular longitudinal position is determined for each GPR of the at least one GPR. The respective mean lateral position and its uncertainty for each of the at least one GPR is aggregated to determine a combined lateral position associated with the particular longitudinal position. A road model is then output including the combined lateral position and its uncertainty associated with the particular longitudinal position. In this way, a robust and computationally efficient road model may be determined to aid in vehicle safety and performance.

Aspects described below include a method of modeling a road at a first time using at least one GPR. The method begins by determining a kernel function for the at least one GPR at the first time based a sample set of detections received from one or more vehicle systems. A respective mean lateral position associated with a particular longitudinal position is then determined for each GPR of the at least one GPR using the kernel function, which are then aggregated to determine a combined lateral position. A road model including the combined lateral position associated with the particular longitudinal position is then output to aid in performance of a vehicle function. In aspects, a system is described that includes at least one processor and a computer-readable storage media that, when executed by the at least one processor, configure or cause the processor to perform aspects of road modeling with ensemble Gaussian processes as described above. The system may be installed on to a vehicle and intended to output a model of the road to aid in performance of a vehicle function of the vehicle. The system may be configured and implemented as any number of processors or computer-readable storage media. The processor and computer-readable storage media may be separate but communicatively coupled elements or a single element, such as a system-on-chip (SoC).

This Summary introduces simplified concepts related to road modeling with ensemble Gaussian processes further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of road modeling with ensemble Gaussian processes are described in this document with reference to the following figures. The same numbers are often used throughout the drawings to reference like features and components.

DETAILED DESCRIPTION

Overview

Road-perception systems are an important technology for advanced driver-assistance systems. Often features of advanced driver-assistance systems, such as adaptive cruise control and automatic emergency breaking, rely on road models to function properly. In addition, some safety standards require road models to not only model the lanes, but to determine uncertainty in the model. In many road modeling processes, a road model is created that determines the occupancy of grids or determines a set of parametric functions to model a road. Often, however, these processes fail to capture the complex road geometries to effectively enable certain vehicle functions featured in advanced driver-assistance systems; they do not provide a mechanism to utilize data from various sources that may be helpful in road modeling (e.g., vision systems, radar tracks, and map data).

In contrast, this document describes computationally efficient and accurate road modeling using ensemble Gaussian processes. For example, these techniques can utilize a Gaussian process regression (GPR) to efficiently and effectively model a road based on the Gaussian process. Specifically, a partitioned framework may be utilized that divides the road modeling problem into multiple, smaller road modeling problems, to increase the efficiency of the road model, overall. This efficiency gain is possible in part by fusing data collected from different sensor systems (e.g., vision, trail, and map data). Moreover, the described techniques allow future measurements to leverage the findings of previous models to improve the overall efficiency and accuracy of the road modeling.

In contrast to current models, the statistical nature of the Gaussian process allows for uncertainty to be easily and usefully determined from each measurement. As a result, the road model that operates in accordance with the techniques described herein, may provide uncertainty values that may be used by the road model itself and downstream components (such as trajectory planning), to enable safe and comfortable vehicle operations. The statistical nature of this approach also allows for inputs into the road modeling system to be tuned to provide accurate results at little expense to computation time. This is particularly important in advanced driver-assistance systems, as delayed output or inaccurate results may cause unsafe or uncomfortable driving behavior that can result in harm to occupants of the vehicle or surrounding passengers.

This section describes just some aspects of how the described techniques, apparatuses, and systems utilize ensemble Gaussian processes to determine a road model. Additional details, examples, and implementations of road modeling with ensemble Gaussian processes are disclosed herein.

Example Environment

Figure 1:
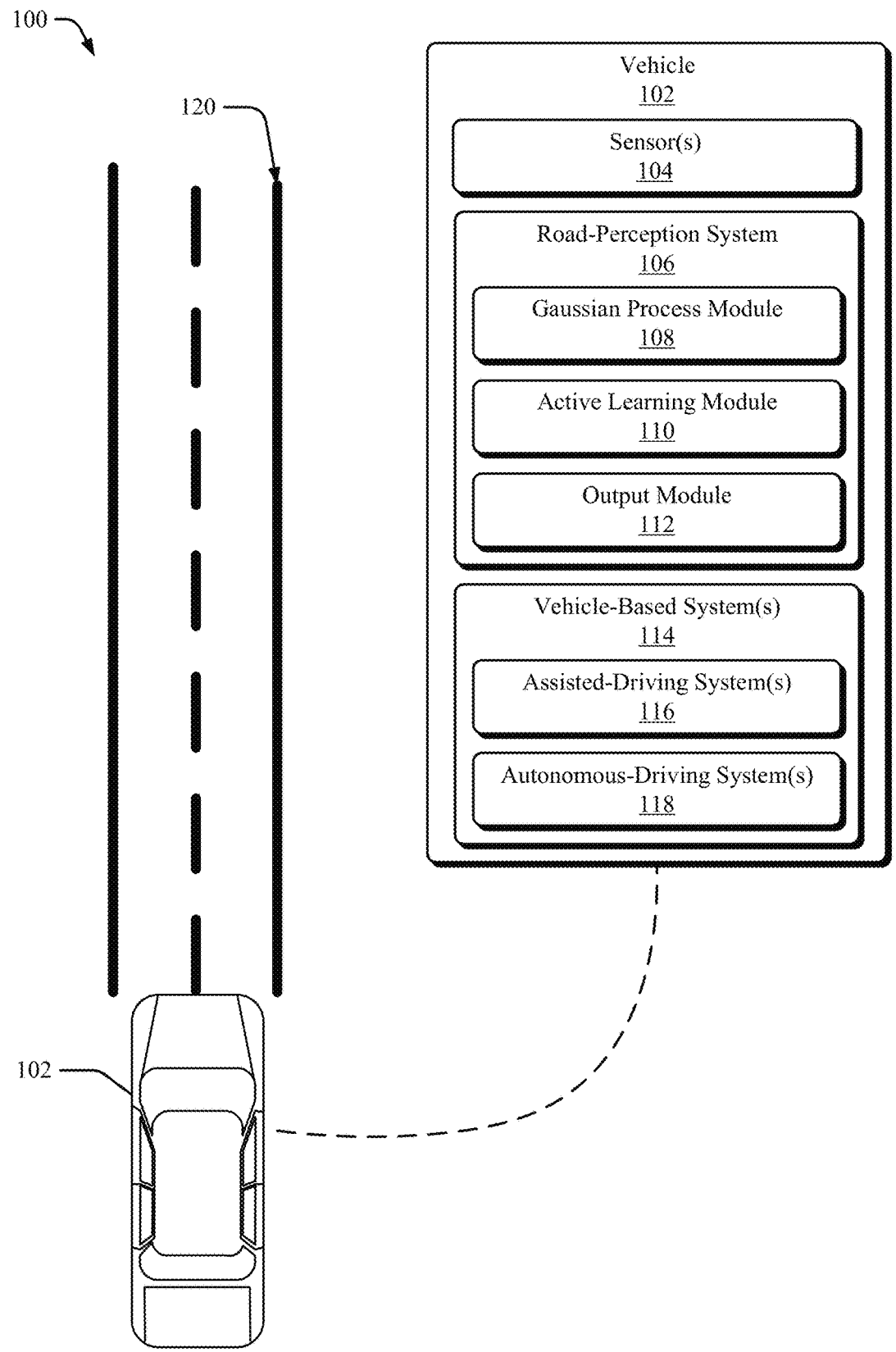
FIG. 1 illustrates an example environment in which road modeling with ensemble Gaussian processes may be implemented.

FIG. 1 illustrates an example environment 100 in which road modeling with ensemble Gaussian processes may be implemented. In the depicted environment 100, a road-perception system 106 is mounted to or integrated within a vehicle 102. The vehicle 102 can travel on a roadway 120, which may include one or more lanes.

Although illustrated as a car, the vehicle 102 can represent other types of motorized vehicles (e.g., a motorcycle, a bus, a tractor, a semi-trailer truck, or construction equipment). In general, manufacturers can mount the road-perception system 106 to any moving platform that can travel on the roadway 120.

In the depicted implementation, a portion of the road-perception system 106 is mounted into a rear-view mirror of the vehicle 102 to have a field-of-view of the roadway 120. The road-perception system 106 can project the field-of-view from any exterior surface of the vehicle 102. For example, vehicle manufacturers can integrate at least a part of the road-perception system 106 into a side mirror, bumper, roof, door, windshield, grill, hood, trunk, or any other interior or exterior location where the field-of-view includes the roadway 120. In general, vehicle manufacturers can design the location of the road-perception system 106 to provide a particular field-of-view that sufficiently encompasses the roadway 120 on which the vehicle 102 may be traveling.

The vehicle 102 includes one or more sensors 104 to provide input data to one or more processors (not illustrated in FIG. 1) of the road-perception system 106. The sensors 104 can include a camera, a radar system, a global positioning system (GPS), a global navigation satellite system (GNSS), a lidar system, or any combination thereof. A camera can take still images or video of the roadway 120. A radar system or a lidar system can use electromagnetic signals to detect objects in the roadway 120 or features of the roadway 120. A GPS or GNSS can determine a position and/or heading of the vehicle 102. The vehicle 102 can include additional sensors to provide input data to the road-perception system 106 regarding the roadway 120 and the lanes thereof. The road-perception system 106 can also obtain input data from external sources (e.g., nearby vehicles, nearby infrastructure, the internet) using vehicle-to-everything (V2X) or cellular communication technology.

The road-perception system 106 can estimate a centerline and a variance associated with one or more distance along the roadway 120 or lane. In aspects, the centerline may represent an appropriate path (e.g., where the center of the vehicle is to travel) for a vehicle traveling within the roadway 120 or lane. The variance may represent an uncertainty associated with a centerline measurement at a particular longitudinal value (e.g., a location along the direction in which the vehicle is traveling). In this manner, a variance may be determined for each centerline value or at each location along the centerline. The variance may be used to determine a confidence in the centerline measurement, for example, a high confidence or a low confidence. This may include any number of statistical operations or thresholding to determine a confidence value. Either of the variance or confidence determinations at a centerline point may be output with the road model for the vehicle subsystems to act on. For example, one or more vehicle-based systems 114 may act more trusting when navigating an area where the road model predicted a high confidence or low variance but may act more cautiously or search for more data when navigating a low confidence or high variance area.

The road-perception system 106 includes a Gaussian process module 108, an active learning module 110, and an output module 112. The Gaussian process module 108 can leverage multiple GPRs to perform a Gaussian function and determine a topology of the roadway 120 or lanes. In aspects, this includes synthesizing multiple GPRs relying on various detections to determine centerline information or other information about the roadway 120 at various points. For example, the Gaussian process module 108 may be used to aggregate detections from different information sources, such as the sensors 104 (e.g., radar measurements, vision measurements from a camera system) or previous knowledge (e.g., from a map database, previous data collected by the sensors 104). The Gaussian process module 108 can also compute an uncertainty or mass value associated with each lane section.

The active learning module 110 can identify detections that may provide the most information gain to individual GPRs or the road model as a whole. For example, the active learning module 110 may determine that the addition of a particular detection from a pool of detections may improve a GPR the most, and thus this detection may be added to the detections used by the model. In this manner, the active learning module 110 may improve the accuracy of the road model with little effect to overall efficiency or speed.

The output module 112 can control the output of the road model, for example, to send the output to the vehicle-based systems 114. This may include determining confidence values associated with elements of the road modeling. In aspects, the output module 112 resolves the determinations of the Gaussian process module 108 into a useful road model.

The vehicle 102 also includes the one or more vehicle-based systems 114 that can use data from the road-perception system 106 to operate the vehicle 102 on the roadway 120. The vehicle-based systems 114 can include an assisted-driving system 116 and an autonomous-driving system 118 (e.g., an Automatic Cruise Control (ACC) system, an automatic emergency braking (AEB) system, Traffic-Jam Assist (TJA) system, Lane-Centering Assist (LCA) system, and L3/L4 Autonomous Driving on Highways (L3/L4) system). Generally, the vehicle-based systems 114 use the road-perception data provided by the road-perception system 106 to perform a function. For example, the assisted-driving system 116 can provide automatic cruise control and monitor for the presence of an object (e.g., as detected by another system on the vehicle 102) in the roadway 120, on which the vehicle 102 is traveling. As another example, the assisted-driving system 116 can provide alerts when the vehicle 102 crosses a lane marker for a lane on the roadway 120 that the vehicle 102 is traveling in.

The autonomous-driving system 118 may move the vehicle 102 to a particular location on the roadway 120 while avoiding collisions with objects detected by other systems (e.g., a radar system, a lidar system) on the vehicle 102. The road-perception data provided by the road-perception system 106 can provide information about the location of the lanes and uncertainty in the location of the lanes to enable the autonomous-driving system 118 to perform a lane change or steer the vehicle 102.

Example Vehicle

Figure 2:
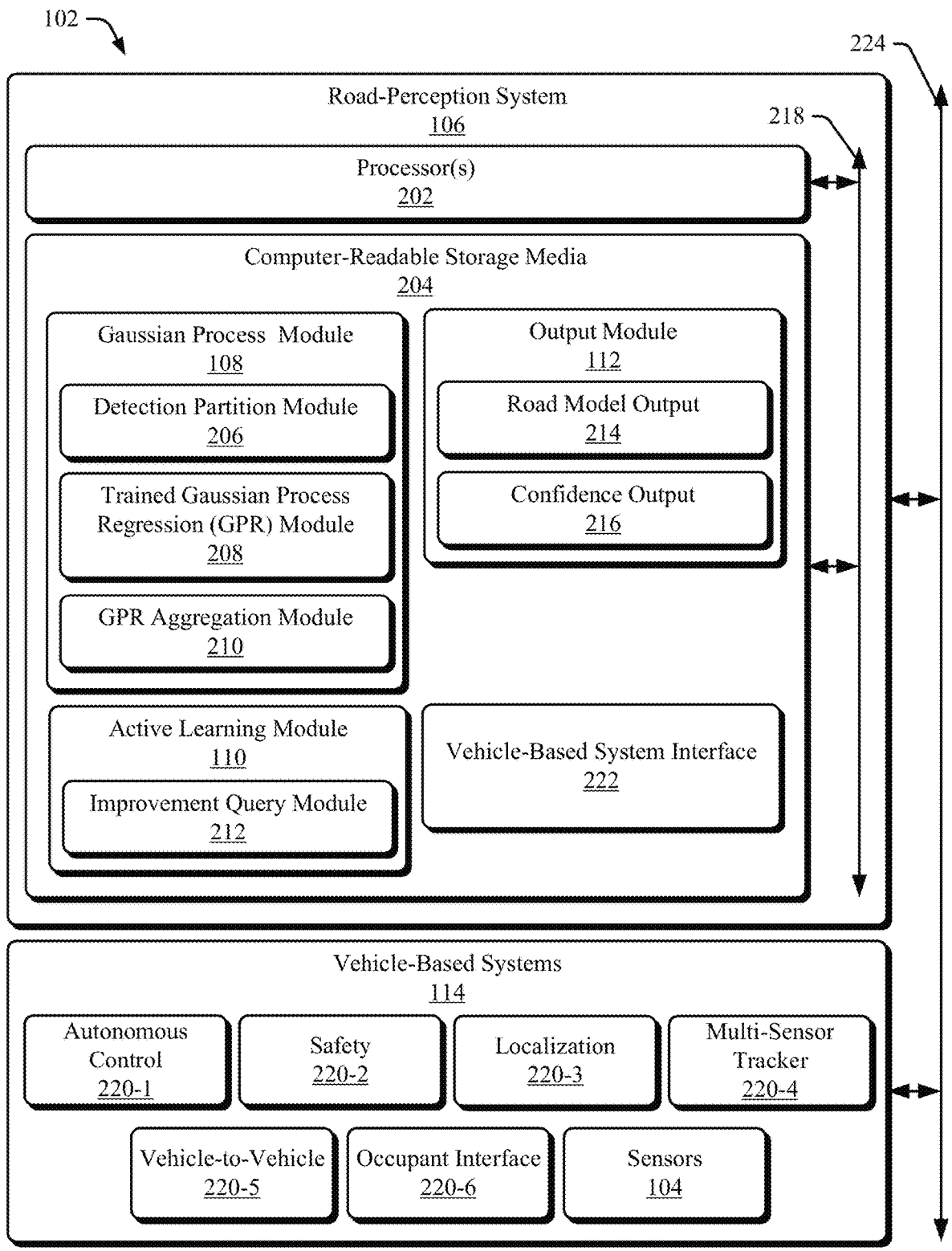
FIG. 2 illustrates an example vehicle implementing road modeling with ensemble Gaussian processes.

FIG. 2 illustrates an example vehicle 102 implementing road modeling with ensemble Gaussian processes. The vehicle 102 includes the road-perception system 106, which can include one or more processors 202 and computer-readable storage media (CRM) 204.

The processor 202 can include, as non-limiting examples, a system on chip (SoC), an application processor (AP), a central processing unit (CPU), an engine control unit (ECU), or a graphics processing unit (GPU). The processor 202 may be a single-core processor or a multiple-core processor implemented with a homogenous or heterogenous core structure. The processor 202 may include a hardware-based processor implemented as hardware-based logic, circuitry, processing cores, or the like. In some aspects, functionalities of the processor 202 and other components of the road-perception system 106 are provided via an integrated processing, communication, and/or control system (e.g., system-on-chip), which may enable various operations of the vehicle 102 in which the system is embodied.

The CRM 204 described herein includes any non-transitory CRM. The CRM 204 may include any suitable memory or storage device such as random-access memory (RAM), static RAM (SRAM), dynamic RAM (DRAM), non-volatile RAM (NVRAM), read-only memory (ROM), or Flash memory useable to store device data (not illustrated) of the road-perception system 106. The CRM 204 can include any combination of volatile or non-volatile memory. The processor 202 may execute any number of computer-executable instructions stored on the CRM 204. In some implementations, the processor 202 is implemented with the CRM 204, for example, as a system-on-chip. In other implementations, the processor 202 is external to the CRM 204, but communicatively coupled to the CRM 204 through data buses, for example, bus 218.

The processor 202 executes computer-executable instructions stored within the CRM 204. As an example, the processor 202 can execute the Gaussian process module 108 to define GPRs, aggregate their models into an accurate model of the roadway 120 and determine an uncertainty associated with the road model. The Gaussian process module 108 can determine GPRs that can be used to model lanes of the roadway 120 by, for example, extracting detections from a high-definition map stored in the CRM 204 and/or tracking them using data from the sensors 104. The Gaussian process module 108 can also determine variance in association with the models using statistical methods inherent to Gaussian processes. The Gaussian process module 108 can be divided into submodules each handling different responsibilities of the GPR determination and aggregation process, for example, a detection partition module 206, a trained GPR module 208, and a GPR Aggregation Module 210.

The detection partition module 206 may be implemented within the CRM 204 and store computer-executable instructions to be executed by the processor 202. When executed by the processor 202, the detection partition module 206 may allow for the detections used to enable the generation of the road model to be partitioned into multiple subsets. In an aspect, each GPR may act on a respective subset. In some implementations, the detections may be partitioned by certain criteria, for example, grouping the detections into subsets based on detection type, location, reliability, or any other feasible method.

Similarly, the trained GPR module 208 may be executed by the processor 202 to determine the parameters of the one or more GPRs. To define each GPR, parameters of a kernel function may be determined based on a sample set of detections. In aspects, the sample set of detections are collected from the various information sources (e.g., sensors 104 and map information). Once the parameters of the kernel function are determined, each GPR may act on a particular partition of the detections as determined through execution of the detection partition module 206. The trained GPR module 208 may be performed iteratively such that the GPRs are updated at each subsequent time step for new detections collected. In this way, the GPRs may leverage the findings of previous iterations to reduce complexity while retaining accuracy in subsequent iterations.

A GPR aggregation module 210 may be implemented in the CRM 204 such that, when executed by the processor 202, the processor 202 aggregates the multiple GPRs into a single road model. That is, the GPR aggregation module 210 can perform an aggregation function. In aspects, executing this aggregation function enables the determination of not only a road model, but uncertainty values associated with the road model, as well. GPR aggregation may allow for multiple experts to contribute to a final road model and thus allow for easy integration of data from various information sources.

To improve the amount of information gained from the inclusion of a detection within the set of detections and to increase overall efficiency of the road modeling process, the processor 202 may execute the computer-executable instructions of the active learning module 110 implemented in the CRM 204. The active learning module 110 may include an improvement query module 212 which determines one or more most effective detection to include in the set of detections for a particular iteration. The detection may be queried from a pool of possible detections, and a detection associated with a most information gain may be chosen. In this way, the active learning module 110 may ensure that both accuracy and complexity are enhanced during the road modeling process.

The road-perception system 106 as illustrated also includes an output module 112 implemented in the CRM 204 that may be executed by the processor 202 to resolve the determinations of the Gaussian process module 108 into a useful road model. For example, the output module 112 may include a road model output 214 indicative of the road information or centerline determined from aggregating the GPRs. The output module 112 may also resolve a confidence output 216 which indicates the uncertainty associated with the road model output 214. The output module 112 may communicate the road model output 214 or the confidence output 216 to a vehicle-based system interface 222 that facilitates communication between the road-perception system 106 and the vehicle-based systems 114. The vehicle-based system interface 222 may control the communication of data along the bus 224 such that road-perception data (e.g., road models) are provided to the vehicle-based systems 114 from the road-perception system 106 along the bus 224.

The vehicle-based systems 114 may include any number of systems as described in FIG. 1. As more non-limiting examples, the vehicle-based systems 114 as illustrated include an autonomous control system 220-1, a vehicle safety system 220-2, a localization system 220-3, a multi-sensor tracker 220-4, a vehicle-to-vehicle communication system 220-5, and an occupant interface 220-6. The sensors 104 used to provide detections may be maintained by one or more of the vehicle-based systems 114 and sensor data may be provided to the road-perception system 106 through the vehicle-based system interface 222. Although not illustrated, the vehicle-based system interface 222 may include separate interfaces for handling communications with different systems of the vehicle-based systems 114, for example, the vehicle-based system interface 222 may include a sensor interface and an autonomous control interface.

These and other operations of the Gaussian process module 108, the active learning module 110, the output module 112, and their respective subcomponents are described in greater detail below.

Example System

Figure 3:
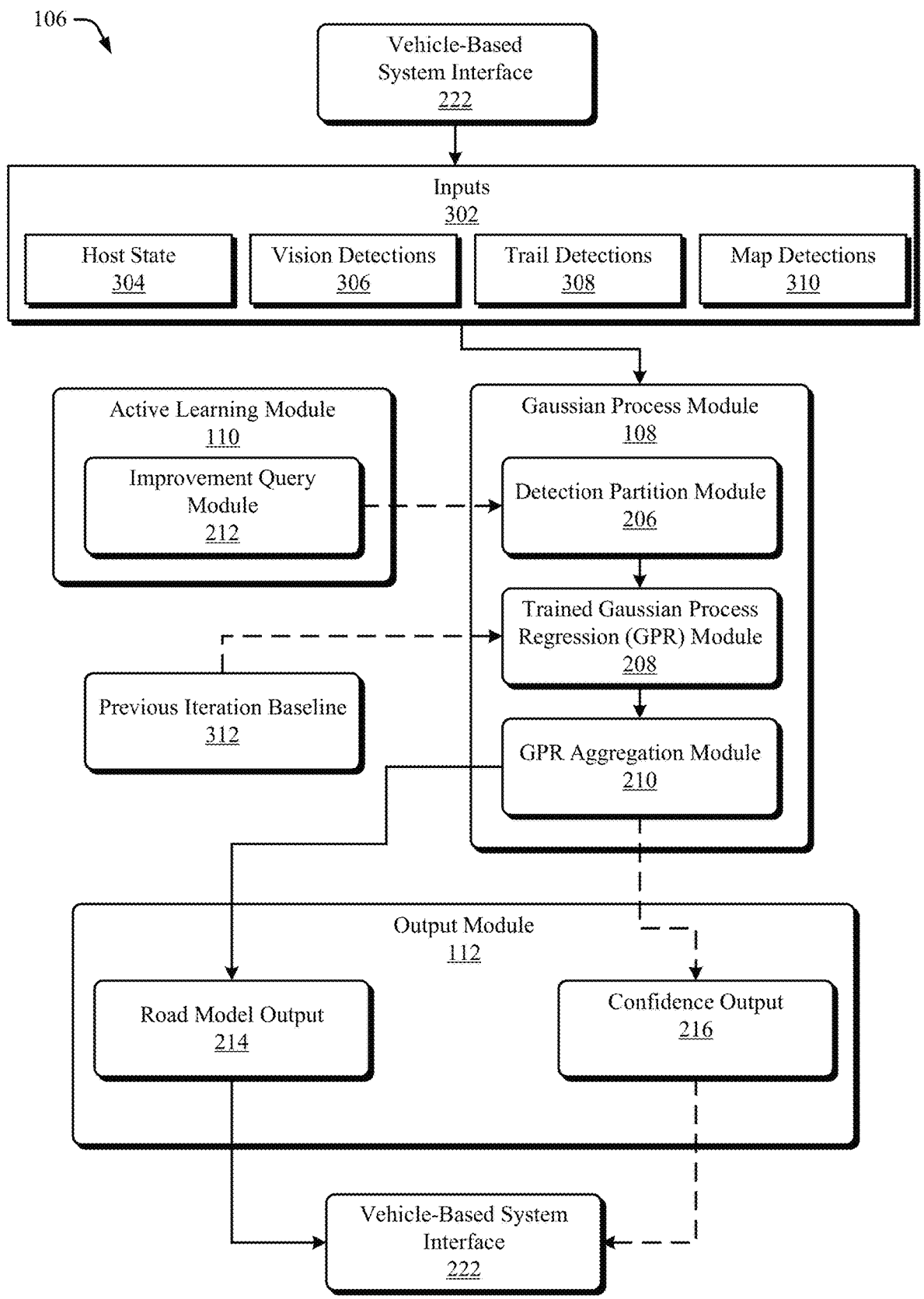
FIG. 3 illustrates an example flowchart of a road-perception system implementing road modeling with ensemble Gaussian processes.

FIG. 3 illustrates an example flowchart of a road-perception system 106 implementing road modeling with ensemble Gaussian processes. The flowchart illustrates example operations of the road-perception system 106 of FIG. 1. The road-perception system 106 utilizes ensemble Gaussian processes to determine a road model.

The road-perception system 106 can use various forms of evidence as inputs 302 received from the vehicle-based systems interface 222. As non-limiting examples, the inputs 302 may include a host state 304, vision detections 306, trail detections 308, or map detections 310. The host state 304 may identify the current state of the vehicle to determine appropriate measurements that are to be made in the road modeling process. For example, the host state 304 may indicate a position, speed, heading, or current purpose of the vehicle to allow the perceptions system 106 to determine what information may be most important during the road modeling process. In aspects, this may include determining the heading of the vehicle so that the road can be modeled in the appropriate relative direction. In some implementations, the road modeling may occur at greater distances when the vehicle is traveling at a greater speed, as the high speed may indicate that a more distant location will be reached quicker than if the vehicle was traveling at a slower speed. In general, any information provided in the host state 304 may be used to determine areas of importance to the perceptions system 106. Though not illustrated, the inputs 302 may include prior knowledge, such as previous road modeling information stored in a CRM (e.g., CRM 204) and determined from a previous occasion on the roadway.

The inputs 302 may also include vision detections 306 from a vision detection system. One example of the vision detections 306 may be camera images that indicate a detected lane boundary of a road, from which a centerline may be determined as a point equidistant from each lane boundary. The vision detections 306 may be captured over time by any appropriate sensor located on or around the interior or exterior portion of the vehicle. In some implementations, the vision sensors may be mounted to a front portion of the vehicle, for example, on the front facing portion of a side mirror, to provide adequate view of the lane boundaries.

The inputs 302 may also include trail detections 308 determined from an appropriate sensor system of the vehicle. For example, the trail detections 308 may be determined from a radar system or lidar system of the vehicle. The radar system or lidar system may act on information collected by their respective sensor devices to detect objects in the field of view and create tracks that can be used to determine the trail detections 308. In one example, the trail detections 308 may be generated from a forwardly distant vehicle traveling on the same roadway as the vehicle. In some aspects, the forwardly distant vehicle may be traveling in a same lane as the vehicle. The tracks may indicate a path of the forwardly distant vehicle and the perception system 106 may utilize the indicated path as an appropriate path for the vehicle. As such, by creating trail detections 308 from the tracks, the vehicle may determine information about the roadway or a centerline.

The perception system 106 may also rely on data in the form of map detections 310 determined from maps of the roadway or surrounding area. For example, the map can include a high-definition map included in the CRM 204 of the road-perception system 106 or memory of the vehicle, a map retrieved from a map or navigation service in communication with the road-perception system 106, or a map obtained from a mobile phone or other device communicatively coupled to the road-perception system 106. Although not illustrated, the perception system 106 may rely on any other appropriate measurement, for example, data or measurements obtained from sensors located outside the vehicle (e.g., embedded in a roadway, integrated with a sign or marker, on-board another vehicle located near the vehicle 102).

The Gaussian process module 108 may then execute to allot the road-perception system 106 to develop a road model for the roadway using the multiple sources of information and evidence provided by the inputs 302. The detection partition module 206 may create one or more subsets from the set of detections provided as the inputs 302. The subsets may be determined from all of the inputs 302 or portions of the inputs 302. In some examples, the subsets are created by sorting the detections based on type, location, reliability, or any other appropriate method. Each subset may have a predetermined size which may be the same as, or different from, the other subsets. Additionally, each subset may be partitioned into one or more subsets.

In some implementations, the active learning module 110 is used to improve the effectiveness of the detections included in each subset. In aspects the improvement query module 212 queries a pool of detections (e.g., from the inputs 302) and determines the detections that provide the most information gain to a GPR. For example, vision detections 306 may be taken at any point along a portion of the road because they rely on continuous lane boundaries captured in camera images, and thus the improvement query module 212 may determine a best location for a detection based on how much information will be gained from the inclusion of the detection in the subset. Multiple methods for determining the best detection can be used by the active learning module 110. For example, the detections may be chosen on the principal of expected improvement or the principal of lower confidence bound. Any detection not chosen within the one or more subsets may be discarded or maintained in the inputs 302 for future iterations. The detection partition module is discussed in greater detail with respect to FIG. 4.

Once partitioned, each subset may be provided to the trained GPR module 208 where each subset may be acted on by an individual GPR to determine individual Gaussian process models. For example, each GPR may be defined by parameters of a kernel function. In general, any kernel function may be used to create the road model. The parameters of the kernel function may be defined such that the log-marginal likelihood is maximized. In some instances, the log-marginal likelihood can be represented as a sum of the log-marginal likelihood for each of the GPRs. The GPRs may be trained through one of two methods, divided training or unified training. In divided training, each subset may be used to train a separate GPR. As a result, the parameter set of the kernel function may be different for each GPR. By dividing the detections into subsets, the size of each training set may be greatly reduced, thereby lowering the time complexity for training the GPRs. In contrast, unified training utilizes a single parameter set for the kernel function that is universal across all GPRs. In unified training, it may be appropriate to represent the log-marginal likelihood as a sum of the log-marginal likelihood of each GPR. In this manner, the number of detections used in each GPR may be lowered similar to the divided training case and thus greatly reduce complexity.

The road-perception system 106 can dynamically update road model and respective uncertainties at discrete time intervals. The time interval for the information update can depend on a tradeoff between accuracy and computational workload. In some implementations, the vehicle-based systems can dynamically alter the time interval depending on road conditions, driving environment, speed of the vehicle, and other considerations provided by the host state 304. In some instances, the GPRs determined may leverage the findings of previous iterations using the previous iteration baseline 312. For example, the previous parameter set for the kernel function determined at the previous iteration may be used as a baseline (e.g., initial values) for the current iteration. In this manner, the GPR may continually increase in accuracy with minimal effect to computational efficiency. Similarly, current iterations of the GPRs may utilize detections captured in previous iterations. As a result, the iterative nature of road modeling with ensemble Gaussian processes allow for accurate and computationally efficient road modeling. The trained GPR module 208 is discussed in greater detail with respect to FIG. 5.

Each of the GPRs may be aggregated by the GPR aggregation module 210. In aspects, aggregation occurs through any number of methods, non-limiting examples of which include the generalized robust Bayesian committee machine, a product-of-experts (PoE), a generalized PoE, a Bayesian committee machine (BCM), or a robust BCM. In some implementations the generalized robust Bayesian committee machine is used due to its convergence to the underlying true predictive distribution when the number of samples goes to infinity. For each longitudinal location along the roadway, the aggregated road model may provide a lateral value. In addition, due to the statistical nature of GPR aggregation, an uncertainty value can be determined for each lateral value provided by the road model. In aspects, the lateral value may define a point along the centerline of a lane and the uncertainty value may be associated with that value. The GPR aggregation module 210 is described in greater detail with respect to FIG. 6.

The road model data, including the modeled centerline or uncertainty may be provided to the output module 112. In some implementations, only the determined values of the road model data are provided to the output module 112, and the uncertainty is not utilized or provided. In this case, the road model output 214 may be produced by the output module 112 and may be indicative of the determined centerline at the current iteration or time interval. In other implementations, the uncertainty may be provided along with the road model data. In aspects, this allows for a confidence output 216 to be produced along with the road model output 214. Each value included within the road model output 214 may include an uncertainty. In this manner, uncertainty values will be provided in accordance with the centerline values determined by the road model. The uncertainty values may be determined from any statistical methods utilizing standard deviation, various statistical distances, or any other appropriate method.

In another implementation, high confidence and low confidence thresholds are determined in accordance with the road model. Confidence thresholds may be based on statistical distances between corresponding lateral positions determined by the various GPRs. For example, the high confidence or low confidence thresholds may be based on the Mahalanobis distance or the Hausdorff distance between corresponding centerline values (e.g., at a same or similar longitudinal position) of the GPRs. As such, the road model may be output using the values from the road model output 214 in accordance with a high, medium, and low confidence portion as determined using the confidence output 216.

The vehicle-based system interface 222 may receive the road model and control the output of the road model to any vehicle-based system. In aspects, the vehicle-based system interface 220 acts as an intermediary between the perception system and the vehicle-based systems. As discussed previously, the vehicle-based systems may act on the road model provided through the vehicle-based system interface 222 to perform a vehicle function.

Figure 4:
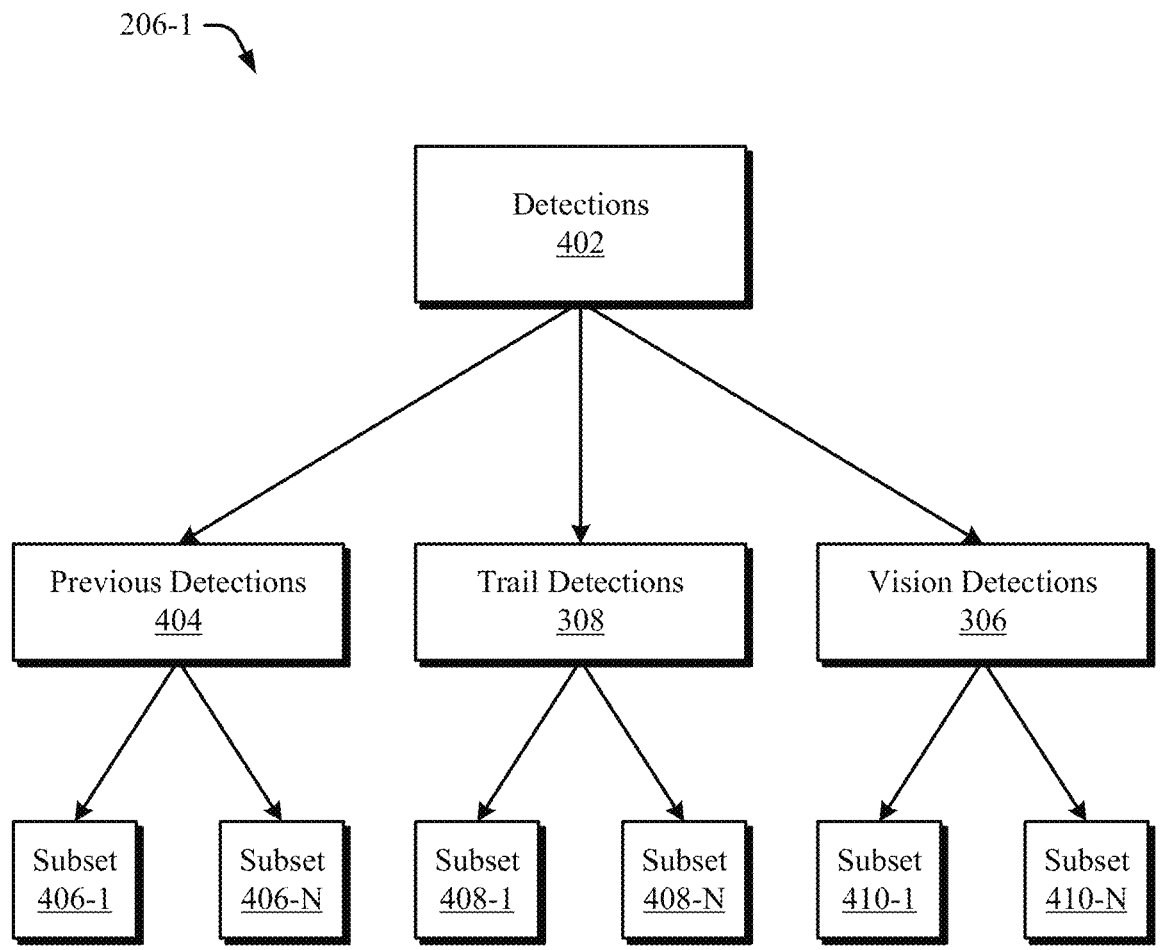
FIG. 4 illustrates an example of a detection partition module in accordance with road modeling with ensemble Gaussian processes.

FIG. 4 illustrates an example of a detection partition module 206-1 (e.g., an example of detection partition module 206) in accordance with road modeling with ensemble Gaussian processes. As illustrated, a set of detections 402 is provided. These detections 402 may be of multiple types as discussed above and include data collected across multiple locations. In this example, the detections are broken down into three categories: previous detections 404, trail detections 308, and vision detections 306. In some implementations, these may be used as the subsets provided to the respective GPRs. For example, a road model may be determined using three GPRs, each acting on a respective one of the previous detections 404, trail detections 308, and the vision detections 306. By partitioning the detections 402 by detection type, GPRs may be better suited to handle each detection set, as all detections in a set may be in similar form. Though the detection sets are illustrated with respect to specific detection types, any number of partitions are possible to create any number of set combinations. Specifically, detection types may be added or excluded from the sets as shown. Moreover, other partitions are possible that do not rely on detection type. For example, the detections 402 may be partitioned based on distance from the vehicle, reliability of the detections, or any other method.

In some implementations, the detections 402 may be divided based on distance from the vehicle. In aspects, this allows the noise value associated with Gaussian processes to be varied across different ranges. This may be beneficial as, in general, a detection may increase in error as the distance from the sensor increases. Thus, by sorting the detections 402 by range, the inherent addition of noise in GPRs allows for sensor error to be accounted for. In other implementations, a Heteroscedastic GPR may be used to handle the varied sensor error across ranges.

In the detection partition module 206-1, the detections 402 are partitioned into subsets, which are then partitioned into additional subsets. Specifically, the previous detections 404 are partitioned into subset 406-1 through subset 406-N, the trail detections 308 are partitioned into subset 408-1 through subset 408-N, and the vision detections 306 are partitioned into subset 410-1 through subset 410-N. The detections 402 may be recursively partitioned any number of times. Additionally, the subsets may be partitioned in accordance with different criteria at different levels. For example, the detections 402 may be first divided into detection type and then each detection type may be divided based on range, or vice versa. Each subset of the detections 402 may be a same or different size to any of the other subset. In some implementations, each subset includes a same predefined number of subsets. In aspects, not all detections from the detections 402 may be used to form the subsets. For example, some of the detections 402 may go unused during partitioning. The unused detections may be discarded by the road-perception system or maintained until a future iteration where they may be used.

To improve the effectiveness of including a detection within a subset, active learning may be used to determine the one or more best detections to include from a set of detections. In aspects, active learning allows for the model to include detections that have the greatest effect in improving the accuracy of the road model. Active learning may be particularly advantageous when applied to vision detections 306, as vision detections 306 may be determined at any point along a roadway. This is because vision detections 306 may provide the polynomial representation of the lane marks. As such, a detection may be determined at any point along the road according to the polynomial representation. Two methods are proposed for determining one or more best detections from a pool of detections. In aspects, the one or more best detections are the detections that provide the most information gain to the model.

In a first method, the one or more best detections may be chosen based on the principal of expected improvement. In this implementation, the detection may be chosen such that the detection that improves the accuracy of the GPR is included within the subset. The equation governing the principle of expected improvement can be broken down as follows:

$$EI(x, GRP) = E_{GRP}[\max(0, \mu_{GPR}(x_{best}) - y(x))]$$

where y(x) is the centerline as provided by the polynomial representation of the lane boundary, x is the longitudinal value of the detection, E is the mean of the Gaussian distribution, and $\mu_{GPR}(*)$ is the mean function given by a GPR. In aspects, the x value that maximizes the expected improvement is the longitudinal value of the best detection.

In a second method, the one or more best detections may be chosen based on the principal of the lower confidence bound. In this implementation, the detection with longitudinal value x may be chosen to maximize the lower confidence bound as defined in the following equation:

$$LCB(x) = 2\sigma_{GRP}(x) - \mu_{GPR}(x)$$

where x is the longitudinal value of the detection, $\sigma_{GRP}(x)$ is the standard deviation given be the GPR, and $\mu_{GPR}(*)$ is the mean function given by the GPR. In aspects the x value that maximizes the lower confidence bound is the longitudinal value of the best detection.

While active learning may work particularly well with the vision detections 306, active learning may be performed on other types of detections. For example, trail detections 308 may be used with active learning and the possible x values may be restricted to longitudinal locations where the trail detections 308 were made. Alternatively, the trail detections 308 may be extrapolated to any value using the heading and position of each of the trail detections 308. In this case, the possible x values for the one or more best detections may not need to be restricted as the detections may be extrapolated to any value. While trail detections 308 are used as an example, this process may be used for any type of detection and is not limited to the trail detections 308. The determination of pseudo-detections (e.g., detection extrapolation) is further described with respect to FIG. 8.

Figure 5:
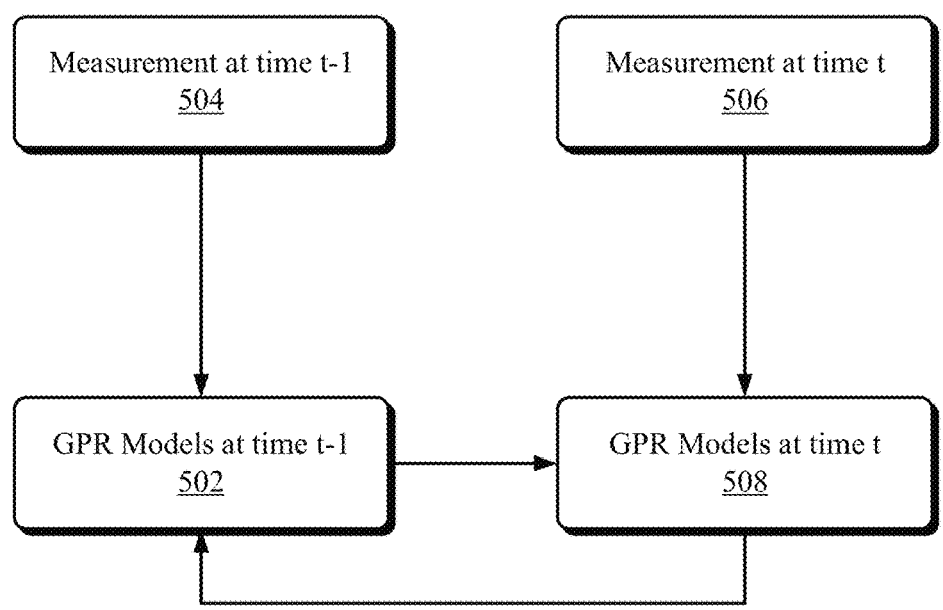
FIG. 5 illustrates an example of a recursive update scheme in accordance with road modeling with ensemble Gaussian processes.

FIG. 5 illustrates an example of a recursive update scheme in accordance with road modeling with ensemble Gaussian processes. The recursive update scheme may be performed by the Gaussian process module 208-1 (e.g., an example of Gaussian process module 208). At 504, the Gaussian process module 208 receives measurements at time t-1. In aspects, the measurements include subsets of the detections as detailed in FIG. 4. At 502, GPRs can be defined at time t-1 based on the measurements received at time t-1. For example, any number of kernel functions known to one of ordinary skill in the art may be used to define GPRs capable of determining a road model. The parameters of the kernel function may be determined in one of two ways: divided training or unified training.

In divided training, each subset of data may be used to train a standard GPR. The GPR may be broken up into a standard regression problem defined as $$y = f(x) + \varepsilon$$

where $\varepsilon$ is approximately equal to $N(0, \sigma_\varepsilon^2)$ and $\sigma_\varepsilon$ represents the noise. In some implementations, the noise may be varied based on the uncertainty associated with the sensor data. For example, sensor data or detections that are located a larger distance from the vehicle may have a larger uncertainty and thus a larger noise value. However, the noise is expected to be equal for all detections within a single GPR. As such, grouping detections by distance from the vehicle may allow for a more representative noise value for each GPR.

Given the training dataset $X = \{x_i\}_{i=1}^N$, $y = \{y_i\}_{i=1}^N$, and the test input $x_*$, the predicted output $f_*$ is represented as a Gaussian distribution. The mean and covariance are given by $$E(f_*) = k_*^T (K + \sigma_\varepsilon^2 I)^{-1} y$$

$$\text{var}(f_*) = k_{**} - k_*^T (K + \sigma_\varepsilon^2 I)^{-1} k_*$$

where k is the kernel function, $k_* = k(X, x_*)$, $k_{**} = k(x_*, x_*)$, $K = (X, X)$. Note that the kernel function may be any of a number of appropriate kernel functions. K represents the kernel matrix that corresponds to the sample set of observations (y). The parameters of the kernel may be trained by maximizing the log-marginal likelihood given by $$\log p(y|x, \theta) = -\frac{1}{2}y(K + \sigma_\varepsilon^2 I)^{-1}y - \frac{1}{2}\log|K + \sigma_\varepsilon^2 I| + const.$$

In the divided training case, each GPR is trained with a separate parameter set based on the subset of detections partitioned for that GPR. By partitioning the detections used in each GPR, the size of each kernel matrix is reduced, thus reducing the time complexity of the operations through a divide and conquer strategy. In aspects, this allows the Gaussian process to be adapted to real time applications such as road modeling.

In contrast, unified training uses a single set of parameters set. The unified training method can be utilized with the introduction of an independence assumption of the subsets of data. With this assumption, the log-marginal likelihood can be represented as a sum of the log-marginal likelihood of each of the $k^{th}$ GPR. Specifically, the log-marginal likelihood becomes $$\log p(y|X, \theta) \approx \Sigma_k \log p_k(y^k|x^k, \theta)$$

where $$\log p_k(y^k|x^k, \theta) = -\frac{1}{2}y^k(K^k + \sigma^2 I)^{-1}y^k - \frac{1}{2}\log|K^k + \sigma^2 I| + const.$$

Note that by dividing the kernel matrix into smaller subsets of the $k^{th}$ GPR, the overall size of the matrix, and thus the matrix multiplication, is reduced. In this manner, unified training using the independence assumption allows for the parameters of the kernel function to be solved efficiently.

In addition to being accurate and efficient, road modeling with ensemble Gaussian processes allows for the detections to be divided into subsets that are seamlessly aggregated later. As a result, the method provides an inherent ability to perform road modeling using multiple types of sensor data. Moreover, the techniques allow determinations made at previous time steps to be leveraged in subsequent iterations. At 506, measurements at time t are introduced, and updated GPRs are determined for time t at 508. In aspects, the subsequent iterations of the GPRs may leverage the findings of previous iterations. For example, the GPRs at time t may utilize the GPRs at time t-1 as a baseline. Specifically, the kernel parameters determined at time t-1 may be used as a starting point to determine the kernel parameters at time t. In this manner, each iteration may improve the accuracy of the model with minimal detriment to runtime complexity. Once the parameters of the kernel function have been determined for a particular time, each of the GPRs may be aggregated to produce the aggregated values included in the road model.

Figure 6:
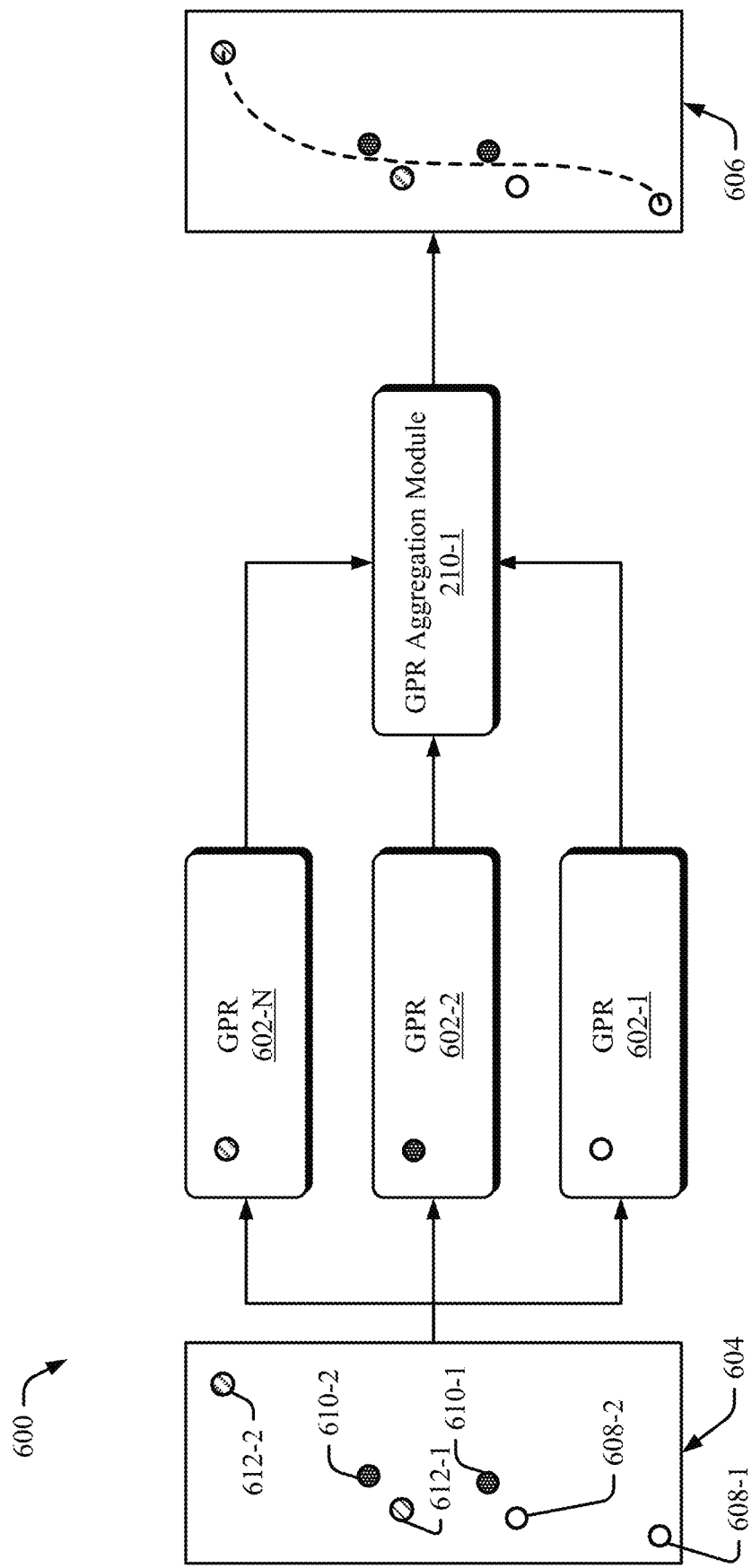
FIG. 6 illustrates an example implementation of a GPR aggregation module in accordance with road modeling with ensemble Gaussian processes.

FIG. 6 illustrates an example implementation 600 of a GPR aggregation module 210-1 (e.g., an example of the GPR aggregation module 210) in accordance with road modeling with ensemble Gaussian processes. The example implementation 600 include a set of detections 604 collected using various information sources. As illustrated, the detections 604 are divided between the GPRs 602. Specifically, the detections are divided into subsets where GPR 602-1 operates on detection 608-1 and detection 608-2, GPR 602-2 operates on detection 610-1 and detection 610-2, and GPR 602-N operates on detection 612-1 and detection 612-2.

Each of the GPRs 602 are trained through either of unified training or divided training. The GPRs 602 each create a model based on the respective subset of detection provided to the GPR. Once the GPRs 602 are trained, each model may be provided to the GPR aggregation module 210-1 to aggregate the respective GPRs 602. In aspects, the GPRs 602 may be aggregated using any one of a product-of-experts (PoE), a generalized PoE, a Bayesian committee machine (BCM), a robust BCM, or a generalized robust BCM. In some implementations, the generalized robust BCM is used due to its convergent nature when the number of samples goes to infinity. The generalized robust BCM can be used to aggregate the information from the different GPRs. As such the posterior distribution is given as $$p(f_*|x_*, D) = \frac{\prod_{k=2}^{M} p_{+k}^{\beta_k(x*)}(f_*|x_*, D^{+k})}{p^{-1+\Sigma_k \beta_k(x*)}(f_*|D^c, x_*)}$$

where $D^c$ is the master expert with global data assignments and $D^{+k} = \{D^c, D^k\}$ is the dataset which incorporates the $k^{th}$ expert and the data assigned to the master expert. $\beta_k(xx)$ allows the contribution of the $k^{th}$ expert contribution at xx. For a given, longitudinal value $x_*$, the lateral value can be described by a normal distribution with mean and standard deviation $$\mu_*^{grbcm} = (\sigma_*^{grbcm})^2 \left(\sum_{k=2,\ldots} \beta_k \sigma_k^{-2}(x_*)\mu_k(x_*) + \left(1 - \sum_{k=2,\ldots} \beta_k\right)\sigma_{**}^{-2}(x_*)\mu_{**}(x_*)\right)$$

$$(\sigma_*^{grbcm})^{-2} = \sum_{k=2,\ldots} \beta_k \sigma_k^{-2}(x_*) + \left(1 - \sum_{k=2,\ldots} \beta_k\right)\sigma_{**}^{-2}(x_*)$$

$$\beta_k = \begin{cases} 1 & k = 2 \\ .5(\log\sigma_c^2(x_*) - \log\sigma_{+k}^2(x_*)) & 3 \le k \le M \end{cases}$$

where $\beta_k$ is defined as the difference in the differential entropy between $p_c(f_*|D^c, x_*)$ and $p_{+k}(f_*|x_*, D^{+k})$.

In aspects, when the GPRs 602 are aggregated through execution of the GPR aggregation module 210-1 a road model 606 is determined. The road model data 606 may be indicative of a centerline of a lane or road as determined by the GPRs 602. The road model data 606 may be used to determine a road model of the roadway. In some implementations, the road model includes an uncertainty value determined from the aggregation. In aspects, the uncertainty value may be determined from the standard deviation determined during GPR aggregation. As shown, an uncertainty may be determined for each point in the road model data 606.

Figure 7:
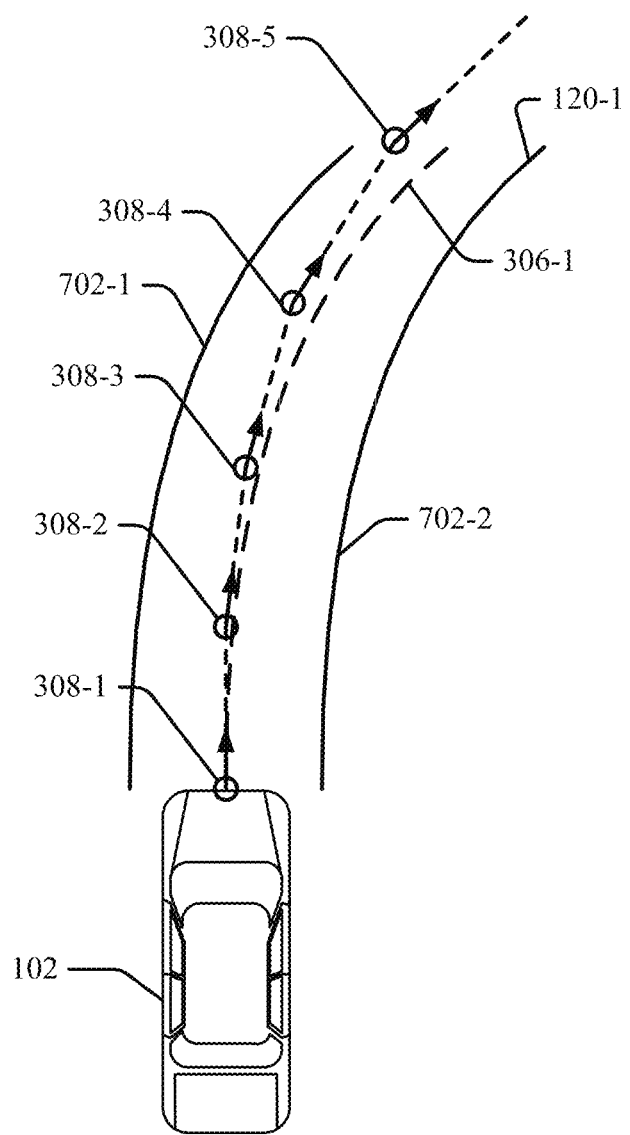
FIG. 7 illustrates an example of vision detections and trail detections.

FIG. 7 illustrates an example of vision detections 306 and trail detections 308. As illustrated, the vehicle 102 is traveling along the roadway 120-1 (e.g., an example of the roadway 120). Multiple detection types are illustrated including the vision detections 306 and trail detections 308. In an aspect, the vision detections 306 are determined based on the lane boundaries 702 (e.g., lane boundary 702-1 and lane boundary 702-2). In aspects the vision detection 306-1 (e.g., an example of the vision detections 306) is a centerline determined based on the lane boundaries 702. The centerline may be determined such that a vision detection 306-1 defined along the centerline is equidistant from the lane boundary 702-1 and the lane boundary 702-2. In aspects, the vision detections 306 are recorded Also illustrated in FIG. 7 are the trail detections 308. In aspects, the trail detections 308 are determined based on a radar system or lidar system capable of generating tracks. In some implementations, the trail detections 308 may include both positioning and heading data. For example, the trail detections 308 illustrated (e.g., trail detection 308-1, trail detection 308-2, trail detection 308-3, trail detection 308-4, and trail detection 308-5) include positioning data (illustrated as circles) and heading data (illustrated as arrows). In general, the positioning data of the trail detections 308 are indicative of the location of the detection on the roadway 120-1, while the heading data is indicative of the direction the of travel at the direction. While illustrated as including both positioning and heading data, the detections utilized to determine the road model may include only positioning data or only heading data. Moreover, the depicted detections may be omitted, or additional detections may be added, such as map detections.

Figure 8:
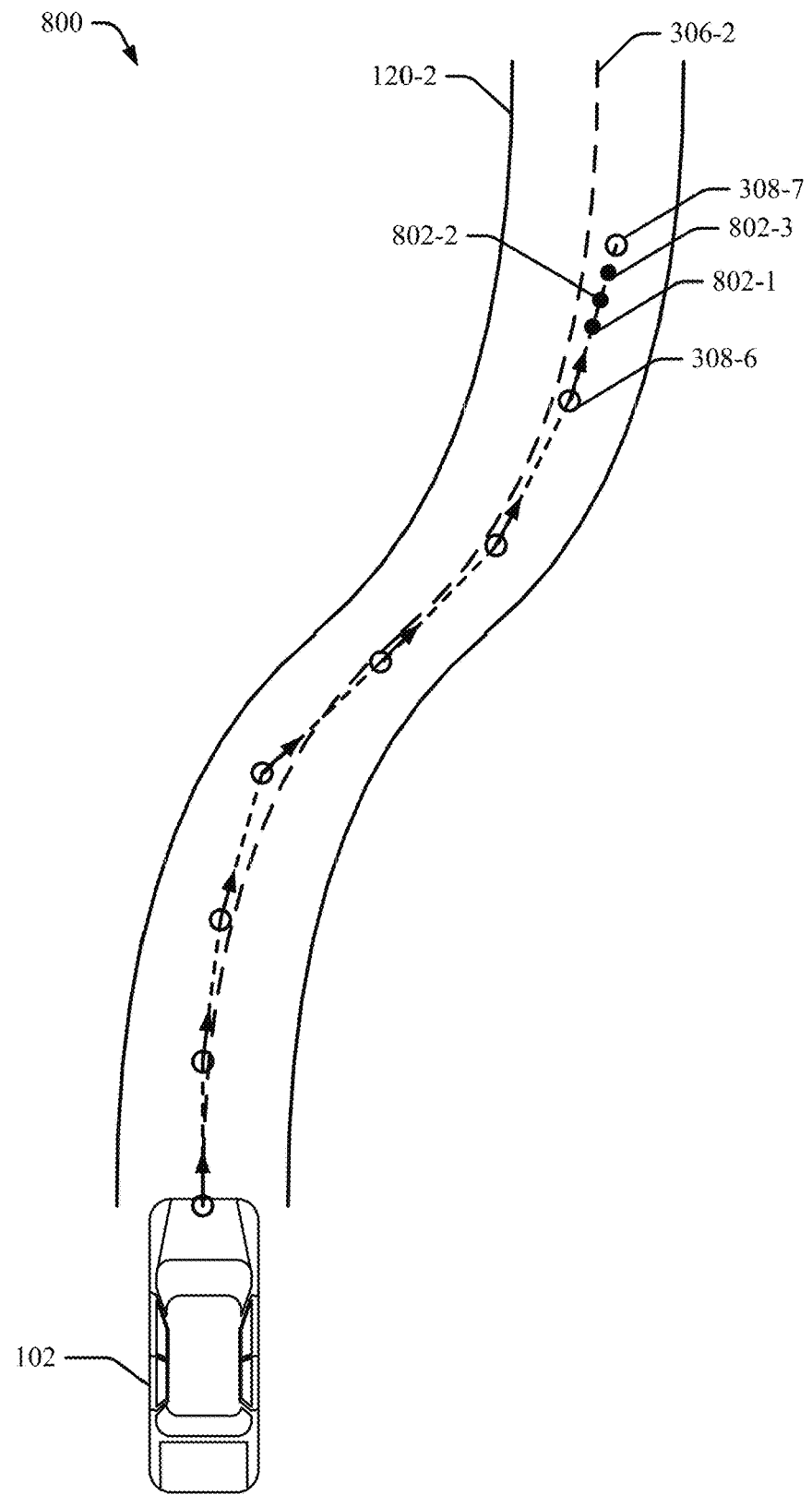
FIG. 8 illustrates an example of pseudo-detections determined from position and heading data.

FIG. 8 illustrates an example of pseudo-detections 802 determined from position and heading data. As illustrated, the vehicle 102 is traveling down the roadway 120-2, an example of the roadway 120, is modeled using vision detections 306-2, an example of the vision detections 306, and trail detections 308 (e.g., trail detection 308-6 and trail detection 308-7). In aspects, the trail detections 308 include positioning data, indicated by circles, and heading data, indicated by arrows. In some implementations, the use of positioning data and heading data may allow for the extrapolation of pseudo-detections 802 (e.g., pseudo-detection 802-1, pseudo-detection 802-2, pseudo-detection 802-3). For example, the pseudo-detections 802 are determined by extending points along the heading from the trail detection 308-6. The points extended using the heading data of the trail detection 308-6 become the psuedo-detections 802. In some implementations, the pseudo-detections 802 may be added to the set of detections to be treated like any other collected from the sensor systems. One advantage of this is that additional pseudo-detections 802 may be extrapolated from a last detection located at a farthest distance from the vehicle 102. In this way, the range on detections may be expanded. Determining pseudo-detections 802 may be particularly advantageous in instances where active learning is used because detections other than vision detections may be extrapolated out to determine the one or more best detections. In this way, the conditions on determining the one or more best detections from the pool of detections may be relaxed, because the psuedo-detections 802 may be created at any point using data from the other points.

The pseudo-detections 802 may also be defined in terms of sine and cosine based on the heading angle from the longitudinal axis. For example, the location of the pseudo-detections 802 may be defined in the lateral axis as the lateral location of the previous detection (e.g., trail detection 308-6) plus the distance between the pseudo-detection (e.g., pseudo-detection 802-1, pseudo-detection 802-2, pseudo-detection 802-3) and the previous detection multiplied by the sine of the heading angle from the longitudinal axis. Similarly, the longitudinal position may be defined as the longitudinal location of the previous detection (e.g., trail detection 308-6) plus the distance between the pseudo-detection (e.g., pseudo-detection 802-1, pseudo-detection 802-2, pseudo-detection 802-3) and the previous detection multiplied by the cosine of the heading angle from the longitudinal axis.

In some implementations, heading data is not used to determine psuedo-detections 802. For example, pseudo-detections 802 may be created by adding points along the shortest connection between two subsequent detections (e.g., trail detection 308-6 and trail detection 308-7). In aspects, the pseudo-detections 802 may be determined by assuming each subsequent detection is connected by a line. This again may allow the pool of detections to support more values for use in active learning. Also note that though described in terms of the trail detections 308, pseudo-detections 802 may be determined from any type of detection.

Figure 9:
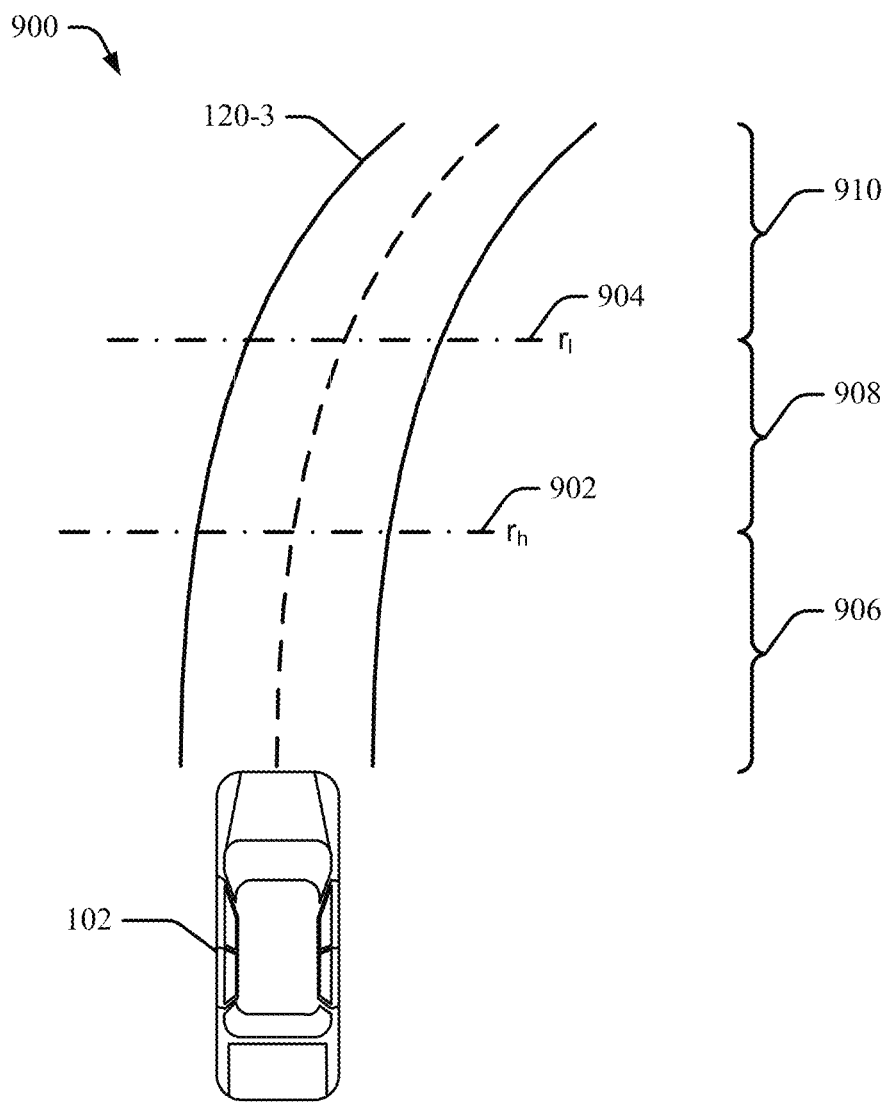
FIG. 9 illustrates an example road model output including a high confidence threshold and a low confidence threshold in accordance with road modeling with ensemble Gaussian processes.

FIG. 9 illustrates an example road model output 900 including a high confidence threshold and a low confidence threshold in accordance with road modeling with ensemble Gaussian processes. As illustrated, the output 900 includes a high confidence longitudinal position 902 ($r_h$) and a low confidence longitudinal position 904 ($r_l$). The vehicle 102 is modeling the roadway 120-3, which is an example of the roadway 120, the vehicle 102 is traveling on. In aspects, the high confidence longitudinal position 902 and the low confidence longitudinal position 904 divide the road model into three sections: a high confidence section 906, a medium confidence section 908, and a low confidence section 910. Specifically, the high confidence section 906 indicates a section where the portion of the road model from the high confidence longitudinal position 902 to the vehicle 102 is reported with a high accuracy or low uncertainty. The medium confidence section 908 is a section of the road model located between the high confidence longitudinal position 902 and the low confidence longitudinal position 904. In some implementations, the medium confidence section 908 is reported with some accuracy and some uncertainty. As such, the vehicle 102 may need to further model the medium confidence section 908 before traversing the roadway 120-3 at that section. The low confidence section 910 may include a portion of the road model that is farther away from the vehicle 102 than the low confidence longitudinal position 904. For example, the low confidence section 910 may correspond to a portion of the road model reported with low accuracy and a high uncertainty. In some implementations, the vehicle 102 may need one or more iterations of road modeling before traversing the roadway 120-3 at the low confidence section 910.

The road modeling output 900 may be determined in a number of different ways, for example, the high confidence longitudinal position 902 and the low confidence longitudinal position 904 may be determined using various statistical distances between detections. In some implementations, the Hausdorff distance is used to determine the location of the high confidence longitudinal position 902 such that all detections from various GPRs at a longitudinal position closer to the vehicle 102 than the high confidence longitudinal position 902 have a Hausdorff distance less than a high confidence threshold value. Moreover, a low confidence threshold value can be set, and a low confidence longitudinal position 904 may be determined such that the road model at longitudinal distances closer to the vehicle 102 than the low confidence longitudinal position 904 have Hausdorff distances less than a low confidence threshold value. In aspects, the low confidence threshold value and the high confidence threshold value may be any predetermined value. In general, the low confidence threshold is higher than the high confidence threshold, as a higher threshold value allows for more measurement uncertainty without exceeding the threshold. In aspects, the high confidence longitudinal position 902 and the low confidence longitudinal position 904 are determined by two factors. First, the consensus score of the different sensors. Second, the likelihood of the road modeling with a given road modeling. Specifically, to determine the high confidence longitudinal position 902 using Hausdorff distance, the following equation may be used $$\tilde{r}_{hh} = \min_r \{D(r;cz) \geq T_{hh}, cz \in C(z_s)\}$$

where $C(z_s)$ is the combination of all comparison pairs from different measurement sources, $T_{hh}$ is the high confidence threshold value, and $D(r; cz)$ is the Hausdorff distance. Similarly, the low confidence longitudinal position 904 may be determined using the Hausdorff distance through the following equation $$\tilde{r}_{lh} = \min_r \{D(r;cz) \geq T_{lh}, cz \in C(z_s)\}$$

where $T_l$ is the low confidence threshold value. Note that the high confidence longitudinal position 902 and the low confidence longitudinal position 904 may be determined at each time interval of the road modeling process.

In some implementations, the Mahalanobis distance is used to determine the high confidence longitudinal position 902 the low confidence longitudinal position 904. For example, the high confidence longitudinal position 902 using Mahalanobis distance may be determined using the following equation $$\tilde{r}_{hm} = \min_r \{(r; z_f, M_0) \geq T_{hm}\}$$

where $z_f$ is the fused measurement for a given longitudinal distance r, $M_0$ is the road model, and $T_{hm}$ is the high confidence threshold value. Similarly, the low confidence longitudinal position 904 may be determined using the Mahalanobis distance through the following equation $$\tilde{r}_{lm} = \min_r \{(r; z_f, M_0) \geq T_{lm}\}$$

where $T_{lm}$ is the low confidence threshold value.

In some implementations, both the Hausdorff distance and the Mahalanobis distance may be used. For example, the minimum longitudinal value of each of the above equations may be taken to determine the high confidence longitudinal position 902 or the low confidence longitudinal position 904. Specifically, the following equation may be used for the high confidence longitudinal position 902

$$\tilde{r}_h = \min_r \{\tilde{r}_{hh}, \tilde{r}_{hm}\}.$$

Similarly, the following equation may be used for the low confidence longitudinal position 904

$$\tilde{r}_l = \min_r \{\tilde{r}_{lh}, \tilde{r}_{lm}\}.$$

In aspects, when multiple statistical distances are used (e.g., the Hausdorff distance and the Mahalanobis distance), the respective low and high confidence threshold values may be the same or different for calculations associated with each statistical difference.

In some implementations, the high confidence longitudinal position 902 or the low confidence longitudinal position 904 are not based on statistical distances but instead based on the standard deviation determined in GPR aggregations. The standard deviation determination is detailed in the description of FIG. 6.

Figure 10:
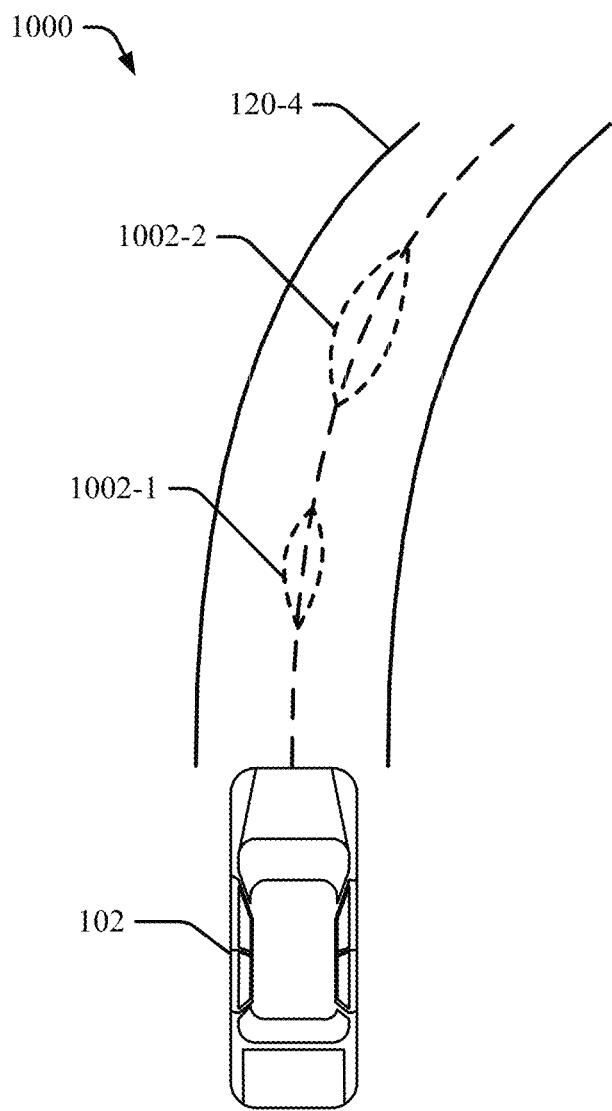
FIG. 10 illustrates another example road modeling output in accordance with road modeling with ensemble Gaussian processes.

FIG. 10 illustrates another example road modeling output 1000 in accordance with road modeling with ensemble Gaussian processes. As illustrated, the vehicle 102 is modeling the roadway 120-4, an example of the roadway 120, that it is traveling on. The road modeling output 1000 includes uncertainties 1002 associated with portions of the road model. For example, the uncertainty 1002-1 is associated with a different portion of the road model than the uncertainty 1002-2. In some implementations, the uncertainties 1002 are determined from the standard deviation generated as part of the aggregation process and detailed in FIG. 6. In other implementations, the uncertainties 1002 are determined from the statistical differences as discussed in FIG. 9.

The uncertainties 1002 may be used to affect the behavior of the vehicle 102 as it traverses the roadway 120-4. For example, at locations where the road modeling output 1000 of the roadway 120-4 includes large uncertainties 1002, the vehicle may reduce speed. Alternatively, or in addition, the vehicle may decrease the time interval used to collect iterations of the road model to allow more information to be gathered about the location with high uncertainty before the vehicle 102 must traverse that portion of the roadway 120-3. Moreover, the vehicle 102 may notify a driver of the vehicle to perform navigation operations while traversing portions of the roadway 120-3 with high uncertainties 1002. As a result of these operations, providing uncertainty measurements as an element of the road modeling output 1000 may provide vehicle-based systems relying on the road modeling output 1000 more information, thus allowing safer and more comfortable driving behavior.

Example Methods

In general, the operations described in any method may be performed but are not necessarily limited to the order or combinations in which the operations are shown herein. Further, any of one or more of the operations may be repeated, combined, or reorganized to provide other operations. For ease of explanation, the methods are described with respect to the elements of FIG. 1.

Figure 11:
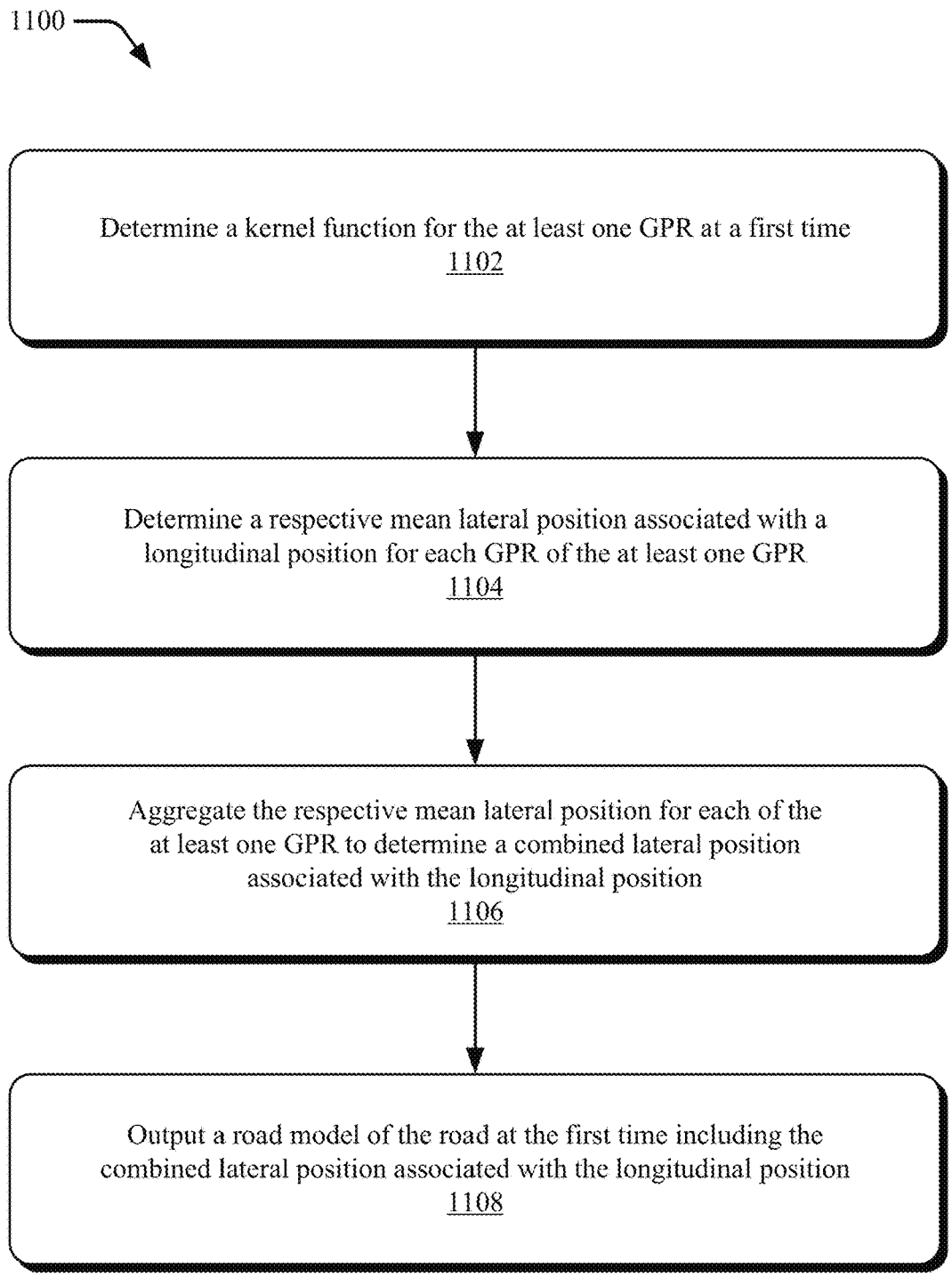
FIG. 11 illustrates an example method of a road-perception system implementing road modeling with ensemble Gaussian processes.

FIG. 11 illustrates an example method 1100 of a road-perception system implementing road modeling with ensemble Gaussian processes. At 1102, a processor executes computer-readable instructions of the Gaussian process module 108 to determine a kernel function for the at least one GPR at a first time. In aspects, determining a kernel function includes determining the parameter set for the kernel function of the at least one GPR. The kernel parameters may be trained through either unified or divided training. As such, the GPRs may each have respective kernel parameters, or the GPRs may all utilize a single parameter set. In aspects, each of the GPRs may utilize a different set of detections to determine the kernel parameters. In this way, the larger problem may be divided into smaller problem sets that utilize a divide and conquer strategy to maintain computational efficiency.

At 1104, a processor executes computer-executable instructions of the Gaussian process module 108 to determine respective mean lateral position associated with a longitudinal position for each GPR of the at least one GPR. For example, a lateral position value may be determined for a longitudinal position on the roadway 120. Each GPR may operate on a different subset of detections, and thus, different GPRs may provide different estimates for a mean lateral position of a specific longitudinal position. In some implementations each GPR utilizes detections of a specific type, within a specific set of longitudinal ranges, or within a specific range of accuracies. In this way, easily comparable detections with similar structure may be handled within a single GPR and may later be aggregated to seamlessly handle data collected from different sources.

At 1106, the respective mean lateral position of each of the at least one GPR is aggregated to determine a combined lateral position associated with a specific longitudinal position. In aspects, the Gaussian process module 108 includes computer-executable instructions that, when executed by the processor, cause the processor to perform the aggregation process using any number of statistical processes, for example, a generalized robust Bayesian committee machine, a product-of-experts (PoE), a generalized PoE, a Bayesian committee machine (BCM), or a robust BCM. In some implementations the generalized robust Bayesian committee machine is used due to its convergence to the underlying true predictive distribution when the number of samples goes to infinity. By determining values from multiple GPRs and then aggregating the values, the road model may be determined from multiple sensor sources while maintaining accuracy and computational efficiency. In addition, the aggregation may provide a statistical method for determining the uncertainty associated with each lateral value corresponding to a specific longitudinal value. As such, the road model may include both the values associated with the model of the road and the uncertainty associated with those values.

At 1108, a road model of the roadway 120 at a first time is output through execution of the output module 112. In aspects, the road model is output to a vehicle-based system 114 to assist in the performance of a vehicle function, for example, an autonomous or assisted driving function. In some implementations, the road model of the roadway 120 include the combined lateral position associated with the longitudinal position and the uncertainty. In other implementations, just the combined lateral positions associated with the longitudinal positions along the roadway 120 are output. In aspects, the road model includes multiple lateral positions respectively associated with multiple longitudinal positions along the roadway 120 to sufficiently model the roadway 120.

Figure 12:
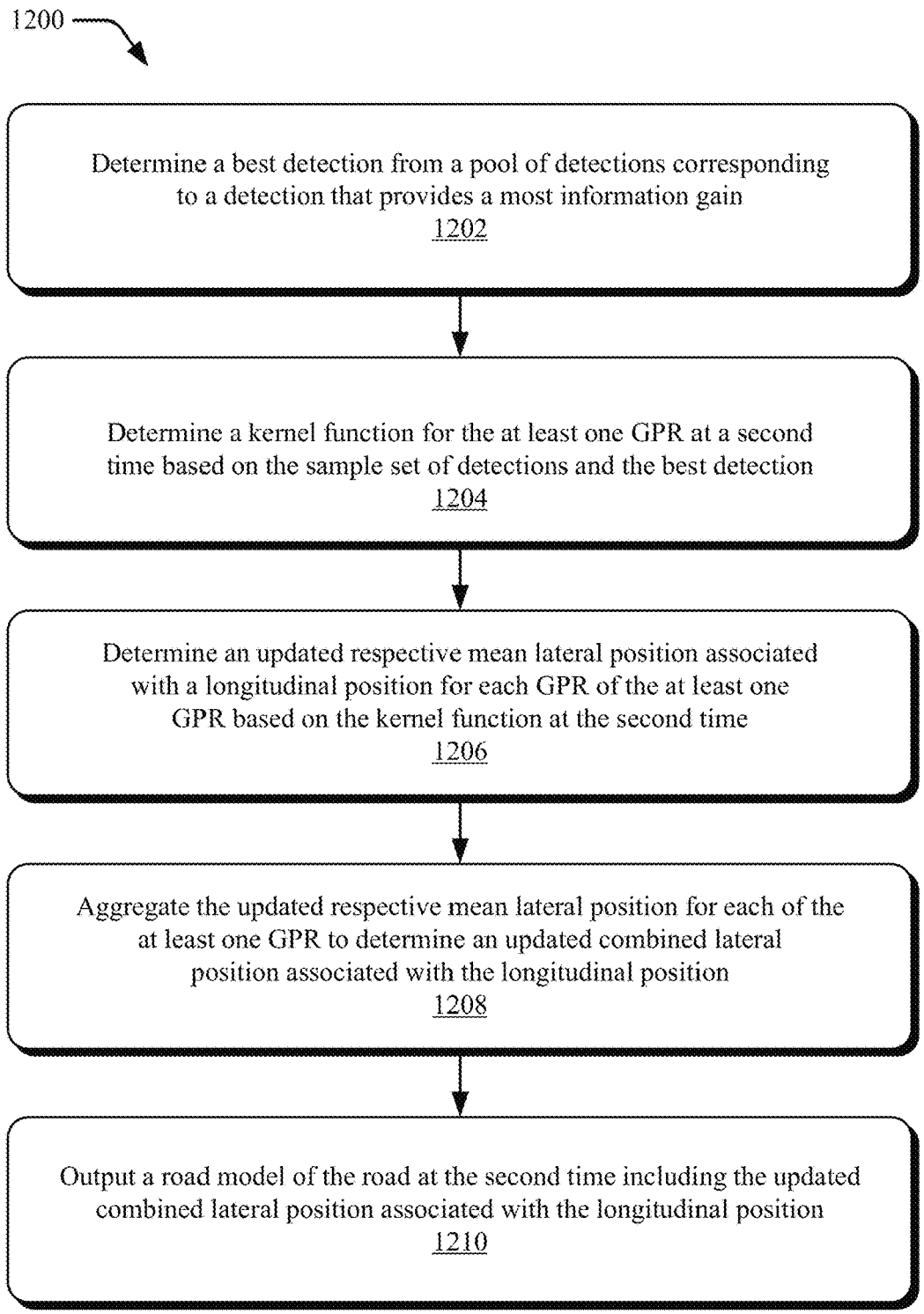
FIG. 12 illustrates an example method of performing active learning in accordance with road modeling with ensemble Gaussian processes.

FIG. 12 illustrates an example method 1200 of performing active learning in accordance with road modeling with ensemble Gaussian processes. In aspects, active learning is performed by execution of computer-executable instruction of the active learning module 110. In aspects, one or more best detections are determined from a pool of detections at 1202. In some implementations, active learning is utilized before a subsequent iteration of the road modeling process is performed. Alternatively, or in addition, active learning may be used to sort the detections into subset during a first iteration. In general, the one or more best detections correspond to detections that provide the most information gain. Specifically, the one or more best detections may be determined using the principal of expected improvement or the principal of lower confidence bound. The active learning may ensure that the detections added to datasets are the most useful detections, thus maintaining or improving accuracy and computational efficiency.

At 1204, a kernel function for the at least one GPR is determined at a second time. In aspects, the kernel function is determined through kernel parameters based on the subsets determined through active learning at 1202. In some implementations, the kernel function at the second time may be determined by leveraging the kernel parameters determined for the first time. In this way, the GPRs may be utilized iteratively to continually update the road model at subsequent times. For example, the kernel function parameters determined in the previous iteration may act as a baseline in subsequent iterations. Moreover, detections from previous iterations may be used to determine the kernel parameters of subsequent iterations. In this way, the accuracy of the road model may continue to improve with minimal regression to computational efficiency.

At 1206, an updated respective mean lateral position associated with a longitudinal position for each GPR is determined. In aspects, the updated respective mean lateral position is based on the kernel function at the second time defined by the kernel parameters determined at the second time. At 1208, the updated respective mean lateral positions associated with the longitudinal position are aggregated to produce an updated combined lateral position associated with the longitudinal position. In aspects, the road model is representative of the combined lateral positions associated with respective longitudinal positions. The aggregation may again include determination of an uncertainty associated with each lateral position. At 1210, the road model of the roadway 120 at the second time is output through execution of the output module 112. In aspects, the road model is output to a vehicle-based system 114 of the vehicle 102 and includes more information or more accurate information about the roadway 120 when compared to the road model at the first time. In some implementations, the road model includes the combined lateral positions and the associated uncertainties.

Figure 13:
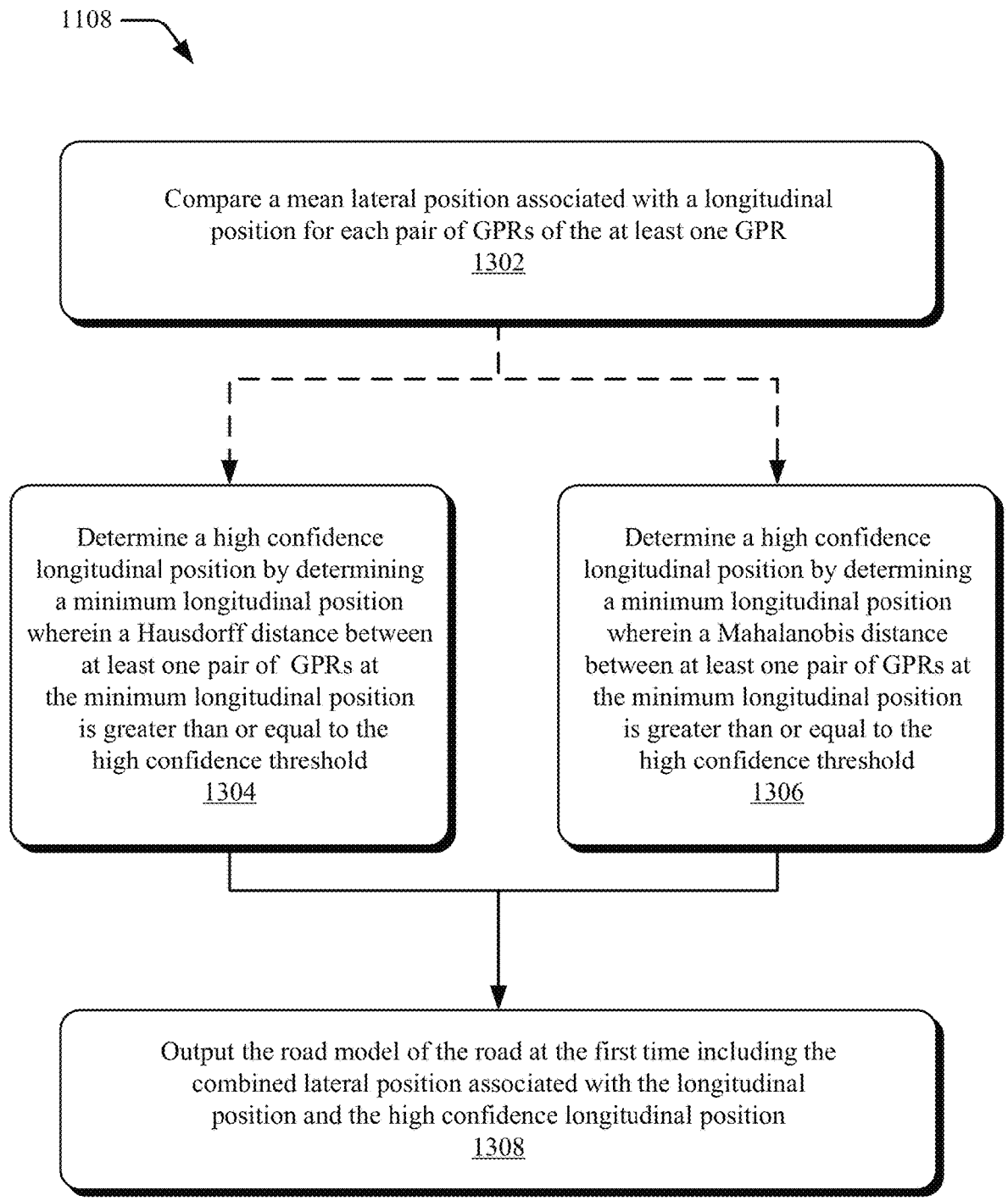
FIG. 13 illustrates a detailed example method of outputting a road model in accordance with road modeling with ensemble Gaussian processes.

FIG. 13 illustrates a detailed example method 1108 of outputting a road model in accordance with road modeling with ensemble Gaussian processes. In aspects, the method 1108 is performed by executing computer-executable instructions of the output module 112. At 1302, the lateral position for each GPR is compared. In aspects, the comparison includes the determination of different statistical differences between the GPRs. The method 1108 may optionally continue to 1304, 1306, or both.

At 1304, a high confidence longitudinal position is determined as the minimum longitudinal position where a Hausdorff distance between at least one pair of GPRs at the minimum longitudinal position is greater than or equal to the high confidence threshold. In aspects, the high confidence threshold is defined as any value depending on application. For example, the high confidence threshold may be lower when a higher confidence is desired, or a high factor of safety is to be achieved. Additionally, or instead of the high confidence longitudinal position, a low confidence longitudinal position is determined as the minimum longitudinal position where a Hausdorff distance between at least one pair of GPRs at the minimum longitudinal position is greater than or equal to the low confidence threshold. In general, the low confidence threshold value is larger than the high confidence threshold value as a higher confidence threshold allows for greater uncertainty without exceeding the threshold.

At 1306, a high confidence longitudinal position is determined as the minimum longitudinal position where a Mahalanobis distance between at least one pair of GPRs at the minimum longitudinal position is greater than or equal to the high confidence threshold. In aspects, the high confidence threshold is defined as any value depending on application, and may be different than the high confidence threshold defined at 1304. Similar to the operations performed at 1304, a low confidence longitudinal position may be determined as the minimum longitudinal position where a Mahalanobis distance between at least one pair of GPRs at the minimum longitudinal position is greater than or equal to the low confidence threshold. Again, the low confidence threshold may be the same as, or different from, the low confidence threshold at 1304.

In implementations where both the operations at 1304 and at 1306 are performed, a minimum low confidence longitudinal position or a minimum high confidence longitudinal position may be determined. In aspects, this is done by performing a minimum operation between the positions determined at 1304 and at 1306.

At 1308, the road model of the road at the first time is output including the combined lateral position associated with the longitudinal position or the high confidence longitudinal position. In some implementations, the road model may include the low confidence longitudinal position. As such, the road model may include a high confidence, medium confidence, and low confidence portion, defined as the portion of the road model from the vehicle 102 to the high confidence longitudinal position, from the high confidence longitudinal position to the low confidence longitudinal position, and from the low confidence longitudinal position to any further longitudinal position from the vehicle 102, respectively. In this manner, the disclosed road modeling with ensemble Gaussian processes allows for a road model to be output that includes accurate values with associated uncertainties.

Additional Examples

Example 1. A method comprising: modeling a road at a first time using at least one Gaussian process regression (GPR), the modeling comprising: determining, based on a sample set of detections received from one or more vehicle systems, a kernel function for the at least one GPR at the first time; determining, based on the kernel function at the first time, a respective mean lateral position for each GPR of the at least one GPR, the respective mean lateral position associated with a particular longitudinal position; aggregating the respective mean lateral position for each of the at least one GPR to determine a combined lateral position associated with the particular longitudinal position; and outputting a road model of the road at the first time including the combined lateral position associated with the particular longitudinal position.

Example 2. The method as recited by any of the previous examples, wherein determining a combined lateral position associated with the particular longitudinal position comprises: determining a variance associated with the longitudinal position; and outputting a road model of the road at the first time further includes the variance associated with the longitudinal position.

Example 3. The method as recited by any of the previous examples, further comprising: modeling the road at a second time using the at least one Gaussian process regression (GPR), the modeling comprising: determining, based on an updated set of detections received from one or more vehicle systems and the kernel function at the first time, a kernel function for the at least one GPR at the second time; determining, based on the kernel function at the second time, an updated respective mean lateral position for each GPR of the at least one GPR, the updated respective mean lateral position associated with a longitudinal position of at least one GPR; aggregating the updated respective mean lateral position for each of the at least one GPR to determine an updated combined lateral position associated with the longitudinal position; and outputting a road model of the road at the second time including the updated combined lateral position associated with the longitudinal position.

Example 4. The method as recited by any of the previous examples, wherein the method further comprises: determining, for the at least one GPR, one or more best detections from a pool of detections, each detection of the pool of detections comprising a longitudinal position and a lateral position, the one or more best detections corresponding to detections that provide a most information gain, wherein the one or more best detections from the pool of detections are included within the sample set of detections.

Example 5. The method as recited by any of the previous examples, wherein the detection that provides the most information gain comprises: a longitudinal position determined to cause greatest change in a respective mean lateral position of the at least one GPR, the respective mean lateral position associated with the longitudinal position.

Example 6. The method as recited by any of the previous examples, wherein the detection that provides the most information gain comprises: a longitudinal position determined to have a greatest lower confidence bound based on a respective mean lateral position associated with the longitudinal position and a respective variance associated with the longitudinal position.

Example 7. The method as recited by any of the previous examples, wherein determining a kernel function for the at least one GPR at the first time comprises determining kernel parameters that result in a maximum log-marginal likelihood.

Example 8. The method as recited by any of the previous examples, wherein determining a kernel function for the at least one GPR at the first time comprises: dividing the sample set of detections into one or more subsets of detections; and determining kernel parameters that result in a maximum sum of each log-marginal likelihood associated with each of the one or more subsets of detections.

Example 9. The method as recited by any of the previous examples, wherein dividing the sample set of detections into the one or more subsets of detections is based on detection type.

Example 10. The method as recited by any of the previous examples, wherein determining the kernel function for the at least one GPR at the first time is further based on a Gaussian noise value.

Example 11. The method as recited by any of the previous examples, wherein aggregating the respective mean lateral position for each of the at least one GPR to determine a combined lateral position associated with the longitudinal position comprises using at least one of: a generalized robust Bayesian committee machine; a product-of-experts; a generalized product-of-experts; a Bayesian committee machine; or a robust Bayesian committee machine.

Example 12. The method as recited by any of the previous examples, wherein outputting the road model of the road at the first time comprises outputting the road model to a vehicle-based system to aid the vehicle-based system in performance of a vehicle function.

Example 13. The method as recited by any of the previous examples, wherein the sample set of detections comprises position data and heading data.

Example 14. The method as recited by any of the previous examples, wherein at least one detection of the sample set of detections is a vision detection received from a vision detection system of a vehicle and based on detected lane boundaries on the road.

Example 15. The as recited by any of the previous examples, wherein at least one detection of the sample set of detections is a trail detection received from a radar system of a vehicle and is based on radar tracks determined by the radar system.

Example 16. The as recited by any of the previous examples, wherein at least one detection of the sample set of detections is a trail detection received from a mapping system of a vehicle and based on a road map of the road.

Example 17. The as recited by any of the previous examples, wherein the sample set of detections includes multiple detection types.

Example 18. The method as recited by any of the previous examples, wherein outputting the road model of the road at the first time comprises: comparing, for each pair of GPRs of the at least one GPR, a mean lateral position associated with a longitudinal position; determining a high confidence longitudinal position wherein each comparison of the mean lateral positions associated with lesser longitudinal position than the high confidence longitudinal position is lesser than a high confidence threshold, the determining comprising: determining a minimum longitudinal position wherein a Hausdorff distance between mean lateral positions of at least on pair of GPRs at the minimum longitudinal position is greater than or equal to the high confidence threshold; or determining a minimum longitudinal position wherein a Mahalanobis distance between mean lateral positions of at least on pair of GPRs at the minimum longitudinal position is greater than or equal to the high confidence threshold; and outputting, as a high confidence position, the combined lateral position associated with the longitudinal positions at a lesser longitudinal position than the high confidence longitudinal position.

Example 19. The method as recited by any of the previous examples, wherein outputting the road model of the road at the first time further comprises: determining a low confidence longitudinal position wherein each comparison of the lateral positions associated with a lesser longitudinal position than the low confidence longitudinal position is lesser than a low confidence threshold, the determining comprising: determining a minimum longitudinal position wherein a Hausdorff distance between mean lateral positions of at least one pair of GPRs at the minimum longitudinal position is greater than or equal to the low confidence threshold; or determining a minimum longitudinal position wherein a Mahalanobis distance between mean lateral positions of at least one pair of GPRs at the minimum longitudinal position is greater than or equal to the low confidence threshold; and outputting, as a medium confidence position, the combined lateral position associated with the longitudinal positions at a lesser longitudinal position than the low confidence longitudinal position and a greater than or equal longitudinal position to the high confidence longitudinal position; and outputting, as a low confidence, the combined lateral position associated with the longitudinal positions at a greater than or equal longitudinal position to the low confidence longitudinal position.

Example 20. A method comprising: modeling a road using at least one Gaussian process regression (GPR), the modeling comprising: determining, for a GPR of the at least one GPR, one or more best detections from a pool of detections, each detection of the pool of detections comprising a longitudinal position and a lateral position, the one or more best detections corresponding to a most information gain; determining, using the GPR of the at least one GPR and the one or more best detections, a respective mean lateral position associated with a longitudinal position; determining, using an aggregation function, a combined lateral position associated with the longitudinal position, the combined lateral position based at least on the respective mean lateral position determined using the one or more best detections; and outputting the road model of the road including the combined lateral position associated with the longitudinal position.

Example 21. The method as recited by any of the previous examples, wherein the detection that corresponds to the most information gain comprises: a longitudinal position determined to cause greatest change in a respective mean lateral position of the at least one GPR, the respective mean lateral position associated with the longitudinal position.

Example 22. The method as recited by any of the previous examples, wherein the detection that corresponds to the most information gain comprises: a longitudinal position determined to have a greatest lower confidence bound based on a respective mean lateral position associated with the longitudinal position and a respective variance associated with the longitudinal position.

Example 23. A system comprising: at least one processor configured to model a road at a first time using at least one Gaussian process regression (GPR), the at least one processor configured to model the road at the first time by: determining, based on a sample set of detections received from one or more vehicle systems, a kernel function for the one or more GPR at the first time; determining, based on the kernel function, a respective mean lateral position for each GPR of the one or more GPR, the respective mean lateral position associated with a longitudinal position; aggregating the respective mean lateral position for each of the at least one GPR to determine a combined lateral position associated with the longitudinal position; and outputting a road model of the road at the first time including the combined lateral position associated with the longitudinal position.

Example 24. The system as recited by any of the previous examples, wherein the at least one processor is configured to: determine a combined lateral position associated with the longitudinal position by determining a variance associated with the longitudinal position; and output a road model of the road at the first time to include the variance associated with the longitudinal position.

Example 25. The system as recited by any of the previous examples, wherein the at least one processor is further configured to: model the road at a second time using the at least one Gaussian process regression (GPR), the at least one processor configured to model the road at the second time by: determining, based on an updated set of detections received from one or more vehicle systems and the kernel function at the first time, a kernel function for the at least one GPR at the second time; determining, based on the kernel function at the second time, an updated respective mean lateral position for each GPR of the at least one GPR, the updated respective mean lateral position associated with a longitudinal position of at least one GPR; aggregating the updated respective mean lateral position for each of the at least one GPR to determine an updated combined lateral position associated with the longitudinal position; and outputting a road model of the road at the second time including the updated combined lateral position associated with the longitudinal position.

Example 26. The system as recited by any of the previous examples, wherein the at least one processor is further configured to: determine, for the at least one GPR, one or more best detections from a pool of detections, each detection of the pool of detections comprising a longitudinal position and a lateral position, the one or more best detections corresponding to detections that provides a most information gain; and include the one or more best detections from the pool of detections within the sample set of detections.

Example 27. The system as recited by any of the previous examples, wherein the at least one processor is further configured to aggregate the respective mean lateral position for each of the at least one GPR to determine a combined lateral position associated with the longitudinal position comprises using at least one of: a generalized robust Bayesian committee machine; a product-of-experts; a generalized product-of-experts; a Bayesian committee machine; or a robust Bayesian committee machine.

Example 28. The system as recited by any of the previous examples, wherein the at least one processor is further configured to output the road model of the road at the first time by: comparing, for each pair of GPRs of the at least one GPR, a mean lateral position associated with a longitudinal position; determining a high confidence longitudinal position, wherein each comparison of the mean lateral positions associated with lesser longitudinal position than the high confidence longitudinal position is lesser than a high confidence threshold, the at least one processor being configured to determine the high confidence longitudinal position by: determining a minimum longitudinal position wherein a Hausdorff distance between mean lateral positions of at least on pair of GPRs at the minimum longitudinal position is greater than or equal to the high confidence threshold; or determining a minimum longitudinal position wherein a Mahalanobis distance between mean lateral positions of at least one pair of GPRs at the minimum longitudinal position is greater than or equal to the high confidence threshold; and outputting, as a high confidence position, the combined lateral position associated with the longitudinal positions at a lesser longitudinal position than the high confidence longitudinal position.

Example 29. The system as recited by any of the previous examples, wherein the at least one processor is further configured to output the road model of the road at the first time by: determining a low confidence longitudinal position wherein each comparison of the lateral positions associated with a lesser longitudinal position than the low confidence longitudinal position is lesser than a low confidence threshold, the at least one processor being configured to determine the low confidence longitudinal position by: determining a minimum longitudinal position, wherein a Hausdorff distance between mean lateral positions of at least one pair of GPRs at the minimum longitudinal position is greater than or equal to the low confidence threshold; or determining a minimum longitudinal position, wherein a Mahalanobis distance between mean lateral positions of at least one pair of GPRs at the minimum longitudinal position is greater than or equal to the low confidence threshold; and outputting, as a medium confidence position, the combined lateral position associated with the longitudinal positions at a lesser longitudinal position than the low confidence longitudinal position and a greater than or equal longitudinal position to the high confidence longitudinal position; and outputting, as a low confidence, the combined lateral position associated with the longitudinal positions at a greater than or equal longitudinal position to the low confidence longitudinal position.

Example 30. The system as recited by any of the previous examples, wherein: the system is installed on a vehicle; and the at least one processor is configured to: responsive to outputting the road model of the road at the first time, execute the road model of the road at the first time to perform of a function of the vehicle.

Example 31. A system comprising a processor configured to perform the methods of any of the previous examples.

Example 32. A system comprising means for performing the methods of any of the previous examples.

Example 33. A non-transitory computer readable storage media comprising instructions that when executed cause a processor to perform the methods of any of the previous examples.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
    modeling a road at a first time using at least one Gaussian process regression (GPR), the modeling comprising:
        determining, based on a sample set of detections received from one or more vehicle systems, a kernel function for the at least one GPR at the first time;
        determining, based on the kernel function at the first time, a respective mean lateral position for each GPR of the at least one GPR, the respective mean lateral position associated with a particular longitudinal position;
        aggregating the respective mean lateral position for each of the at least one GPR to determine a combined lateral position associated with the particular longitudinal position; and
        outputting a road model of the road at the first time including the combined lateral position associated with the particular longitudinal position.

2. The method of claim 1, wherein determining a combined lateral position associated with the particular longitudinal position comprises:
    determining a variance associated with the longitudinal position; and
    outputting a road model of the road at the first time further includes the variance associated with the longitudinal position.

3. The method of claim 1, further comprising:
    modeling the road at a second time using the at least one Gaussian process regression (GPR), the modeling comprising:
        determining, based on an updated set of detections received from one or more vehicle systems and the kernel function at the first time, a kernel function for the at least one GPR at the second time;
        determining, based on the kernel function at the second time, an updated respective mean lateral position for each GPR of the at least one GPR, the updated respective mean lateral position associated with a longitudinal position of at least one GPR;
        aggregating the updated respective mean lateral position for each of the at least one GPR to determine an updated combined lateral position associated with the longitudinal position; and
        outputting a road model of the road at the second time including the updated combined lateral position associated with the longitudinal position.

4. The method of claim 1, wherein the method further comprises:
    determining, for the at least one GPR, one or more best detections from a pool of detections, each detection of the pool of detections comprising a longitudinal position and a lateral position, the one or more best detections corresponding to detections that provide a most information gain,
wherein the one or more best detections from the pool of detections are included within the sample set of detections.

5. The method of claim 3, wherein the detection that provides the most information gain comprises:
a longitudinal position determined to cause greatest change in a respective mean lateral position of the at least one GPR, the respective mean lateral position associated with the longitudinal position.

6. The method of claim 3, wherein the detection that provides the most information gain comprises:
a longitudinal position determined to have a greatest lower confidence bound based on a respective mean lateral position associated with the longitudinal position and a respective variance associated with the longitudinal position.

7. The method of claim 1, wherein determining a kernel function for the at least one GPR at the first time comprises determining kernel parameters that result in a maximum log-marginal likelihood.

8. The method of claim 1, wherein determining a kernel function for the at least one GPR at the first time comprises:
dividing the sample set of detections into one or more subsets of detections; and
determining kernel parameters that result in a maximum sum of each log-marginal likelihood associated with each of the one or more subsets of detections.

9. The method of claim 8, wherein dividing the sample set of detections into the one or more subsets of detections is based on detection type.

10. The method of claim 1, wherein determining the kernel function for the at least one GPR at the first time is further based on a Gaussian noise value.

11. The method of claim 1, wherein aggregating the respective mean lateral position for each of the at least one GPR to determine a combined lateral position associated with the longitudinal position comprises using at least one of:
a generalized robust Bayesian committee machine;
a product-of-experts;
a generalized product-of-experts;
a Bayesian committee machine; or
a robust Bayesian committee machine.

12. The method of claim 1, wherein outputting the road model of the road at the first time comprises outputting the road model to a vehicle-based system to aid the vehicle-based system in performance of a vehicle function.

13. The method of claim 1, wherein the sample set of detections comprises position data and heading data.

14. The method of claim 1, wherein at least one detection of the sample set of detections is a vision detection received from a vision detection system of a vehicle and based on detected lane boundaries on the road.

15. The method of claim 1, wherein at least one detection of the sample set of detections is a trail detection received from a radar system of a vehicle and is based on radar tracks determined by the radar system.

16. The method of claim 1, wherein at least one detection of the sample set of detections is a map detection received from a mapping system of a vehicle and based on a road map of the road.

17. The method of claim 1, wherein the sample set of detections includes multiple detection types.

18. The method of claim 1, wherein outputting the road model of the road at the first time comprises:
comparing, for each pair of GPRs of the at least one GPR, a mean lateral position associated with a longitudinal position;
determining a high confidence longitudinal position wherein each comparison of the mean lateral positions associated with lesser longitudinal position than the high confidence longitudinal position is lesser than a high confidence threshold, the determining comprising:
determining a minimum longitudinal position wherein a Hausdorff distance between mean lateral positions of at least on pair of GPRs at the minimum longitudinal position is greater than or equal to the high confidence threshold; or
determining a minimum longitudinal position wherein a Mahalanobis distance between mean lateral positions of at least on pair of GPRs at the minimum longitudinal position is greater than or equal to the high confidence threshold; and
outputting, as a high confidence position, the combined lateral position associated with the longitudinal positions at a lesser longitudinal position than the high confidence longitudinal position.

19. The method of claim 18, wherein outputting the road model of the road at the first time further comprises:
determining a low confidence longitudinal position wherein each comparison of the lateral positions associated with a lesser longitudinal position than the low confidence longitudinal position is lesser than a low confidence threshold, the determining comprising:
determining a minimum longitudinal position wherein a Hausdorff distance between mean lateral positions of at least one pair of GPRs at the minimum longitudinal position is greater than or equal to the low confidence threshold; or
determining a minimum longitudinal position wherein a Mahalanobis distance between mean lateral positions of at least one pair of GPRs at the minimum longitudinal position is greater than or equal to the low confidence threshold; and
outputting, as a medium confidence position, the combined lateral position associated with the longitudinal positions at a lesser longitudinal position than the low confidence longitudinal position and a greater than or equal longitudinal position to the high confidence longitudinal position; and
outputting, as a low confidence, the combined lateral position associated with the longitudinal positions at a greater than or equal longitudinal position to the low confidence longitudinal position.

20. A method comprising:
modeling a road using at least one Gaussian process regression (GPR), the modeling comprising:
determining, for a GPR of the at least one GPR, one or more best detections from a pool of detections, each detection of the pool of detections comprising a longitudinal position and a lateral position, the one or more best detections corresponding to a most information gain;
determining, using the GPR of the at least one GPR and the one or more best detections, a respective mean lateral position associated with a longitudinal position;
determining, using an aggregation function, a combined lateral position associated with the longitudinal position, the combined lateral position based at least on the respective mean lateral position determined using the one or more best detections; and
outputting the road model of the road including the combined lateral position associated with the longitudinal position.

21. The method of claim 20, wherein the detection that corresponds to the most information gain comprises:
a longitudinal position determined to cause greatest change in a respective mean lateral position of the at least one GPR, the respective mean lateral position associated with the longitudinal position.

22. The method of claim 20, wherein the detection that corresponds to the most information gain comprises:
a longitudinal position determined to have a greatest lower confidence bound based on a respective mean lateral position associated with the longitudinal position and a respective variance associated with the longitudinal position.

23. A system comprising:
at least one processor configured to model a road at a first time using at least one Gaussian process regression (GPR), the at least one processor configured to model the road at the first time by:
determining, based on a sample set of detections received from one or more vehicle systems, a kernel function for the one or more GPR at the first time;
determining, based on the kernel function, a respective mean lateral position for each GPR of the one or more GPR, the respective mean lateral position associated with a longitudinal position;
aggregating the respective mean lateral position for each of the at least one GPR to determine a combined lateral position associated with the longitudinal position; and
outputting a road model of the road at the first time including the combined lateral position associated with the longitudinal position.

24. The system of claim 23, wherein the at least one processor is configured to:
determine a combined lateral position associated with the longitudinal position by determining a variance associated with the longitudinal position; and
output a road model of the road at the first time to include the variance associated with the longitudinal position.

25. The system of claim 23, wherein the at least one processor is further configured to:
model the road at a second time using the at least one Gaussian process regression (GPR), the at least one processor configured to model the road at the second time by:
determining, based on an updated set of detections received from one or more vehicle systems and the kernel function at the first time, a kernel function for the at least one GPR at the second time;
determining, based on the kernel function at the second time, an updated respective mean lateral position for each GPR of the at least one GPR, the updated respective mean lateral position associated with a longitudinal position of at least one GPR;
aggregating the updated respective mean lateral position for each of the at least one GPR to determine an updated combined lateral position associated with the longitudinal position; and
outputting a road model of the road at the second time including the updated combined lateral position associated with the longitudinal position.

26. The system of claim 23, wherein the at least one processor is further configured to:
determine, for the at least one GPR, one or more best detections from a pool of detections, each detection of the pool of detections comprising a longitudinal position and a lateral position, the one or more best detections corresponding to detections that provide a most information gain; and
include the one or more best detections from the pool of detections within the sample set of detections.

27. The system of claim 23, wherein the at least one processor is further configured to aggregate the respective mean lateral position for each of the at least one GPR to determine a combined lateral position associated with the longitudinal position comprises using at least one of:
a generalized robust Bayesian committee machine;
a product-of-experts;
a generalized product-of-experts;
a Bayesian committee machine; or
a robust Bayesian committee machine.

28. The system of claim 23, wherein the at least one processor is further configured to output the road model of the road at the first time by:
comparing, for each pair of GPRs of the at least one GPR, a mean lateral position associated with a longitudinal position;
determining a high confidence longitudinal position, wherein each comparison of the mean lateral positions associated with lesser longitudinal position than the high confidence longitudinal position is lesser than a high confidence threshold, the at least one processor being configured to determine the high confidence longitudinal position by:
determining a minimum longitudinal position wherein a Hausdorff distance between mean lateral positions of at least on pair of GPRs at the minimum longitudinal position is greater than or equal to the high confidence threshold; or
determining a minimum longitudinal position wherein a Mahalanobis distance between mean lateral positions of at least one pair of GPRs at the minimum longitudinal position is greater than or equal to the high confidence threshold; and
outputting, as a high confidence position, the combined lateral position associated with the longitudinal positions at a lesser longitudinal position than the high confidence longitudinal position.

29. The system of claim 28, wherein the at least one processor is further configured to output the road model of the road at the first time by:
determining a low confidence longitudinal position wherein each comparison of the lateral positions associated with a lesser longitudinal position than the low confidence longitudinal position is lesser than a low confidence threshold, the at least one processor being configured to determine the low confidence longitudinal position by:
determining a minimum longitudinal position, wherein a Hausdorff distance between mean lateral positions of at least one pair of GPRs at the minimum longitudinal position is greater than or equal to the low confidence threshold; or
determining a minimum longitudinal position, wherein a Mahalanobis distance between mean lateral positions of at least one pair of GPRs at the minimum longitudinal position is greater than or equal to the low confidence threshold; and outputting, as a medium confidence position, the combined lateral position associated with the longitudinal positions at a lesser longitudinal position than the low confidence longitudinal position and a greater than or equal longitudinal position to the high confidence longitudinal position; and outputting, as a low confidence, the combined lateral position associated with the longitudinal positions at a greater than or equal longitudinal position to the low confidence longitudinal position.

30. The system of claim 23, wherein:

the system is installed on a vehicle; and the at least one processor is configured to:

responsive to outputting the road model of the road at the first time, execute the road model of the road at the first time to perform of a function of the vehicle.

* * * * *